(12) United States Patent
Wasserman

(10) Patent No.: US 10,805,659 B2
(45) Date of Patent: Oct. 13, 2020

(54) ELECTRONIC DISPLAY SYSTEMS CONNECTED TO VEHICLES AND VEHICLE-BASED SYSTEMS

(71) Applicant: Allstate Insurance Company, Northbrook, IL (US)

(72) Inventor: Robert Wasserman, Wheaton, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 16/786,233

(22) Filed: Feb. 10, 2020

(65) Prior Publication Data

US 2020/0177944 A1    Jun. 4, 2020

Related U.S. Application Data

(60) Continuation of application No. 16/410,239, filed on May 13, 2019, now Pat. No. 10,582,248, which is a
(Continued)

(51) Int. Cl.
*G06Q 30/02* (2012.01)
*H04N 21/414* (2011.01)
(Continued)

(52) U.S. Cl.
CPC ... *H04N 21/41415* (2013.01); *G06Q 30/0265* (2013.01); *G08G 1/09* (2013.01);
(Continued)

(58) Field of Classification Search
None
See application file for complete search history.

(56) References Cited

U.S. PATENT DOCUMENTS

| 5,214,793 A | 5/1993 | Conway et al. |
| 5,381,155 A | 1/1995 | Gerber |

(Continued)

FOREIGN PATENT DOCUMENTS

| WO | 2001043104 A1 | 6/2001 |
| WO | 2001057763 A1 | 8/2001 |

OTHER PUBLICATIONS

Harley Lorenz Geiger, "A Framework for Digital Signage Privacy", publication date unknown, but before May 19, 2014.
(Continued)

*Primary Examiner* — Brent Swarthout
(74) *Attorney, Agent, or Firm* — Banner & Witcoff, Ltd.

(57) ABSTRACT

Electronic digital display systems, including roadside display devices, vehicle-based devices, personal mobile devices, intermediary servers, advertising servers, and/or additional external data sources may operate individually or in combination to identify one or more vehicle locations, driving routes, driver and passenger characteristics, and the like. Vehicle and individual characteristics may be determined based on data received from traffic cameras, vehicle-based devices, personal mobile devices, and/or other data sources. Based on the vehicle characteristics, individual characteristics, driving data and driving patterns, and the like, digital content may be determined for electronic roadside displays to be viewable by the approaching vehicles, and/or other digital display devices to be viewable by associated individuals via other display devices and at other times. Various techniques may be used to determine customized digital content, such as targeted advertisements and/or driving or vehicle safety messages, including retrieval and aggregation of certain characteristics, prioritization of characteristics, and real-time auctions for advertisements. Additionally, certain systems may be interactive
(Continued)

to allow user responses and follow-up content via on-board vehicle devices or other user devices.

20 Claims, 8 Drawing Sheets

Related U.S. Application Data continuation of application No. 15/355,396, filed on Nov. 18, 2016, now Pat. No. 10,341,709, which is a division of application No. 15/018,101, filed on Feb. 8, 2016, now Pat. No. 9,536,428, which is a division of application No. 14/281,390, filed on May 19, 2014, now Pat. No. 9,293,042.

(51) Int. Cl.

| | |
|---|---|
| G08G 1/09 | (2006.01) |
| H04N 21/222 | (2011.01) |
| H04N 21/4143 | (2011.01) |
| H04N 21/422 | (2011.01) |
| H04N 21/4223 | (2011.01) |
| H04N 21/458 | (2011.01) |
| H04N 21/81 | (2011.01) |
| G07C 5/08 | (2006.01) |
| G07C 5/00 | (2006.01) |
| G06K 9/00 | (2006.01) |

(52) U.S. Cl.
CPC .......... *G08G 1/093* (2013.01); *H04N 21/222* (2013.01); *H04N 21/4143* (2013.01); *H04N 21/41407* (2013.01); *H04N 21/41422* (2013.01); *H04N 21/4223* (2013.01); *H04N 21/42202* (2013.01); *H04N 21/4586* (2013.01); *H04N 21/812* (2013.01); *H04N 21/814* (2013.01); *G06K 9/00785* (2013.01); *G06K 2209/15* (2013.01); *G07C 5/008* (2013.01); *G07C 5/0816* (2013.01)

(56) References Cited

U.S. PATENT DOCUMENTS

| | | | |
|---|---|---|---|
| 6,587,755 B1 | 7/2003 | Smith et al. | |
| 7,882,653 B2 | 2/2011 | Barlow | |
| 9,293,042 B1 | 3/2016 | Wasserman | |
| 9,536,428 B1 | 1/2017 | Wasserman | |
| 9,581,461 B1 | 2/2017 | Chintakindi et al. | |
| 10,051,306 B1 | 8/2018 | Wasserman | |
| 10,133,530 B2 | 11/2018 | Wasserman | |
| 10,341,709 B1* | 7/2019 | Wasserman | H04N 21/4143 |
| 10,545,711 B2 | 1/2020 | Wasserman | |
| 10,582,248 B2* | 3/2020 | Wasserman | H04N 21/222 |
| 2003/0004806 A1 | 1/2003 | Vaitekunas | |
| 2003/0220866 A1 | 11/2003 | Pisaris-Henderson et al. | |
| 2005/0021393 A1 | 1/2005 | Bao et al. | |
| 2005/0088320 A1 | 4/2005 | Kovach | |
| 2006/0229939 A1 | 10/2006 | Bhakta et al. | |
| 2008/0089288 A1 | 4/2008 | Anschutz et al. | |
| 2010/0002079 A1 | 1/2010 | Krijn et al. | |
| 2010/0223112 A1 | 9/2010 | Griffin et al. | |
| 2011/0010228 A1 | 1/2011 | Goto | |
| 2011/0093330 A1 | 4/2011 | Burckart et al. | |
| 2012/0029964 A1 | 2/2012 | Tengler et al. | |
| 2012/0054028 A1 | 3/2012 | Tengler et al. | |
| 2012/0290150 A1 | 11/2012 | Doughty et al. | |
| 2013/0060642 A1 | 3/2013 | Shlomot | |
| 2014/0046701 A1 | 2/2014 | Steinberg et al. | |
| 2014/0122220 A1 | 5/2014 | Bradley et al. | |
| 2014/0214543 A1 | 7/2014 | Gandhi | |
| 2015/0120961 A1 | 4/2015 | Mao et al. | |
| 2015/0332623 A1 | 11/2015 | Cheatham, III et al. | |
| 2015/0339780 A1 | 11/2015 | Collopy et al. | |
| 2016/0198306 A1 | 7/2016 | Miles et al. | |
| 2017/0255966 A1 | 9/2017 | Khoury | |
| 2018/0025554 A1 | 1/2018 | Gibson et al. | |
| 2018/0082379 A1 | 3/2018 | Kelsh et al. | |
| 2019/0043088 A1 | 2/2019 | Garcia et al. | |

OTHER PUBLICATIONS

Robert Salladay, "High-tech billboards tune in to driver's taste/ Roadside signs coming to Bay Area listen to car radios, then adjust pitch—SF Gate", Webpage from www.sfgate.com/bayarea/article/ High-tech-billboards-tune-in-to-drivers-tastes-2744204.php; date captured Dec. 3, 2014.

Nandan et al., "AdTorrent: Digital Billboards for Vehicular Networks", publication dated May 30, 2005.

"Digital outdoor advertising billboard that recognizes your car", webpage, http://engagis.com/digital-outdoor-advertising-billboard-that-recognizes-your-car/, captured Dec. 3, 2014.

Christopher Hall, "Mini drivers take a spin on DOOH", webpage, www.digitalsigningetoday.com/article/219229/Mini-drivers-take-a-spin-on-DOOH, date captured Dec. 3, 2014.

Luan et al., "VTube" Towards the Media Rich City Life with Autonomous Vehicular Content Distribution, publication late unknown unknown, but before May 19, 2014.

Oct. 4, 2017—U.S. Notice of Allowance—U.S. Appl. No. 15/355,368.
Nov. 20, 2017—(WO) International Search Report—PCT/US17/051762.
Jan. 26, 2018—U.S. Notice of Allowance—U.S. Appl. No. 15/355,368.
Feb. 16, 2018—U.S. Non-Final Office Action—U.S. Appl. No. 15/267,771.
Jul. 6, 2018—U.S. Notice of Allowance—U.S. Appl. No. 15/267,771.
Jul. 19, 2018—U.S. Supplemental Notice of Allowability—U.S. Appl. No. 15/267,771.
Nov. 28, 2018—U.S. Notice of Allowance—U.S. Appl. No. 16/152,833.
Dec. 21, 2018—U.S. Non-Final Office Action—U.S. Appl. No. 15/982,654.
Dec. 21, 2018—U.S. Non-Final Office Action—U.S. Appl. No. 16/183,158.
Apr. 3, 2019—U.S. Notice of Allowance—U.S. Appl. No. 16/183,158.
May 10, 2019—U.S. Notice of Allowance—U.S. Appl. No. 15/982,654.
May 21, 2019—U.S. Notice of Allowance—U.S. Appl. No. 16/152,833.
Jun. 28, 2019—(WO) International Search Report & Written Opinion—PCT/US19/032905.
Aug. 28, 2019—U.S. Notice of Allowance—U.S. Appl. No. 16/152,833.
Mar. 26, 2020—U.S. Non-Final Office Action—U.S. Appl. No. 16/701,387.
Jul. 8, 2020—U.S. Notice of Allowance—U.S. Appl. No. 16/701,387.
Aug. 7, 2020—U.S. Non-Final Office Action—U.S. Appl. No. 16/448,441.

\* cited by examiner

ELECTRONIC DISPLAY SYSTEMS CONNECTED TO VEHICLES AND VEHICLE-BASED SYSTEMS

CROSS REFERENCE TO RELATED APPLICATIONS

This application is a continuation of and claims priority to U.S. application Ser. No. 16/410,239, (now U.S. Pat. No. 10,582,248) entitled "Electronic Display Systems Connected to Vehicles and Vehicle-Based Systems," filed May 13, 2019, which is a continuation of and claims priority to U.S. application Ser. No. 15/355,396 (now U.S. Pat. No. 10,341,709) which is a divisional of and claims priority to U.S. application Ser. No. 15/018,101 (now U.S. Pat. No. 9,536,428), filed Feb. 8, 2016, and entitled "Electronic Display Systems Connected to Vehicles and Vehicle-Based Systems," which is a divisional of and claims priority to U.S. application Ser. No. 14/281,390 (now U.S. Pat. No. 9,293,042), filed May 19, 2014, and entitled, "Electronic Display Systems Connected to Vehicles and Vehicle-Based Systems," which are incorporated herein by reference in their entirety.

TECHNICAL FIELD

Various aspects of the disclosure relate to determining and displaying digital content for electronic display devices based on vehicle data, individual data, driving data, and the like. More specifically, aspects of the disclosure relate to systems and methods for receiving vehicle characteristics, individual characteristics, and driving data from various sources corresponding to current and previous driving trips, and determining and displaying digital content via electronic display devices such as electronic roadside displays or other display devices.

BACKGROUND

Roadside displays are commonly used as billboard advertisements, traffic signs, safety warning signs, and the like. Governmental entities may install street signs, speed limit signs, warnings for hazardous road conditions, and directional or navigational signs. Additionally, advertisers may purchase or lease roadside billboards for certain periods of time. Although roadside displays have been traditionally non-digital (i.e., wooden and metal signs and billboards), more recent roadside displays now may be partially or entirely digital, such as programmable speed limit signs, electronic traffic warning signs, and digital billboards.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses for determining and displaying digital content via roadside displays and other display devices, based on the characteristics of approaching vehicles and individuals. In various examples and embodiments, electronic display systems may include one or more roadside display devices and/or other digital display devices, on-board vehicle devices, intermediary servers, advertising servers, and/or additional external data sources configured to operate individually or in combination. One or more vehicles or individuals approaching an electronic roadside display device or other display device may be identified, for example, using on-board vehicle devices, traffic cameras, personal mobile devices, and other devices in an electronic display system. Characteristics of the approaching vehicles, individuals associated with the approaching vehicles, driving data, driving patterns, and/or other data may be retrieved and analyzed in order to determine the digital content to be displayed on the display devices. In various cases, the determined digital content may correspond to a targeted advertisement, vehicle maintenance suggestion, driving safety warning, or other customized message based on the characteristics of the associated vehicles and individuals.

Additional aspects of the disclosure relate to retrieving and analyzing characteristics from multiple different vehicles and individuals, including aggregating and/or prioritizing certain characteristics or other data when selecting a targeted advertisement or message. In some examples, a real-time auction software application may allow multiple different advertisers to compete for digital advertising times based on the identified characteristics of the associated vehicles and individuals. Still other aspects of the disclosure relate to interactive systems in which users may provide responses to the content displayed via roadside displays and/or other display devices, for example, using vehicle-based devices or personal mobile devices. User responses to the initial content displayed via display devices may be used to select follow-up content, which may be transmitted for displaying to one or more target devices.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
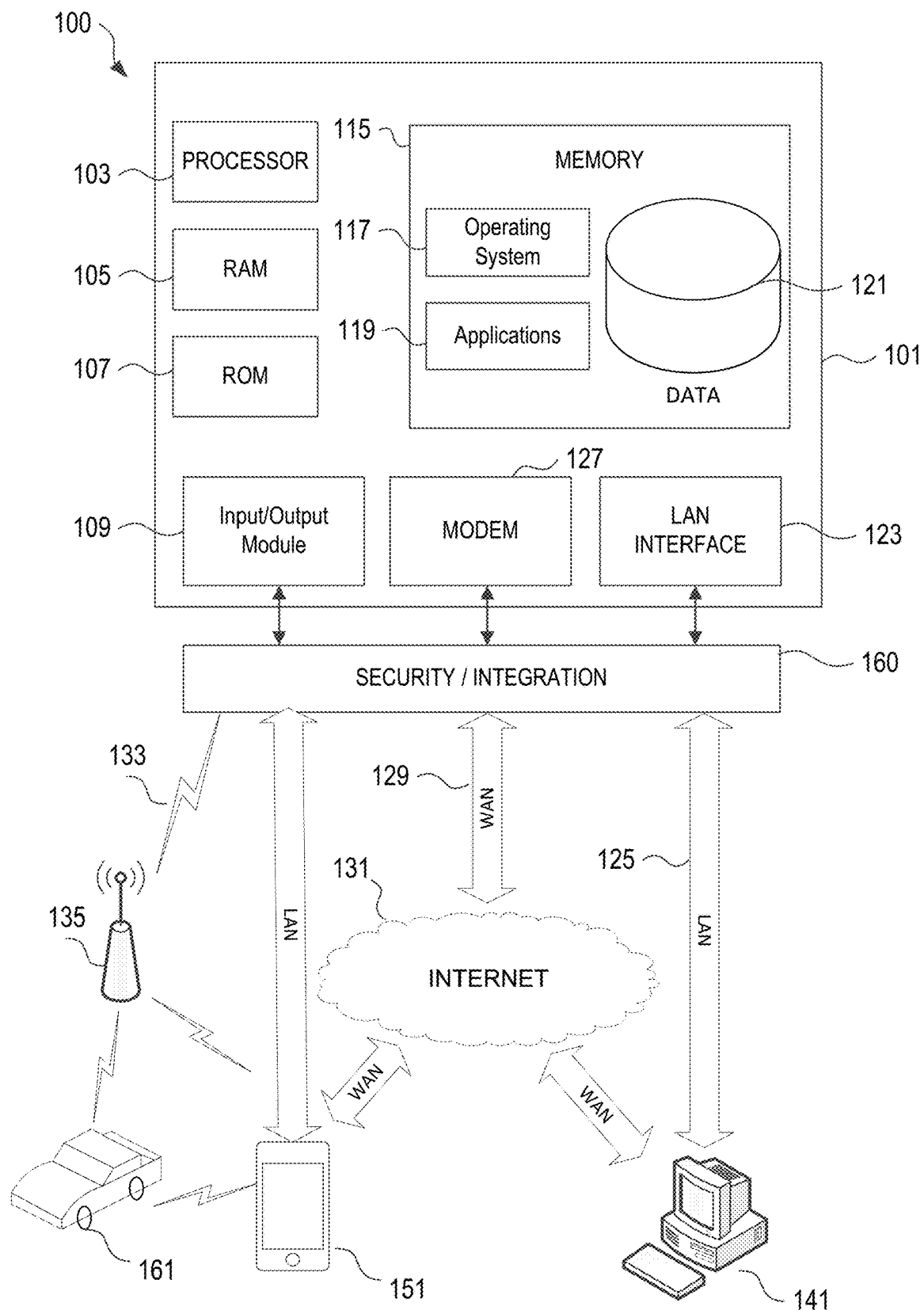
FIG. 1 illustrates computing systems and a network environment that may be used to implement aspects of the disclosure.

FIG. 1 illustrates a block diagram of a computing device (or system) 101 in a computer system 100 that may be used according to one or more illustrative embodiments of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141 and 151, security and integration hardware 160) may correspond to any of multiple systems or devices described herein, such as an electronic display systems (e.g., digital billboards, roadside signs, and other outdoor digital displays), on-board vehicle computing systems, intermediary server systems, external data source systems, and the like. These various computing systems may be configured individually or in combination, as described herein, for identifying vehicles approaching electronic displays, retrieving and/or determining various vehicle and individual (e.g., driver or passenger) characteristics of the associated vehicles, and determining digital content for the electronic roadside displays and other display devices, based on the characteristics of the associated vehicles and individuals.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various actions. For example, memory 115 may store software used by the device 101, such as an operating system 117, application programs 119, and an associated internal database 121. The various hardware memory units in memory 115 may include volatile and nonvolatile, removable and non-removable media implemented in any method or technology for storage of information such as computer-readable instructions, data structures, program modules or other data. Certain devices and systems within electronic display systems may have minimum hardware requirements in order to support sufficient storage capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a device 101 (e.g., an electronic display device 101, intermediary server device 101, on-board vehicle system 101, etc.), in order to identify vehicles near or on-route to electronic roadside displays or other digital displays, determine various characteristic of the vehicles or passengers, determine digital content for the electronic roadside displays and other display devices, etc. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 Ghz or faster). Processor(s) 103 and its associated components may allow the system 101 to execute a series of computer-readable instructions, for example, to identify vehicles at specific locations, retrieve or determine vehicle or passenger characteristics, and determine digital content for electronic roadside displays or other display devices.

The computing device (e.g., an electronic display system, intermediary server, on-board vehicle system or mobile device, etc.) may operate in a networked environment 100 supporting connections to one or more remote computers, such as terminals 141, 151, and 161. Such terminals may be personal computers or server 141 (e.g., home computers, laptops, web servers, database servers), mobile communication devices 151 (e.g., mobile phones, tablet computers, etc.), vehicle-based computing systems 161 (e.g., on-board vehicle systems, telematics devices, mobile phones or other personal mobile devices within vehicles), and the like, each of which may include some or all of the elements described above with respect to the computing device 101. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 151 and 161 (e.g., mobile phones, portable customer computing devices, on-board vehicle computing systems, etc.) via one or more network devices 135 (e.g., base transceiver stations) in the wireless network 133.

Also illustrated in FIG. 1 is a security and integration layer 160, through which communications are sent and managed between the device 101 (e.g., an electronic display system, an intermediary server, a user computer or mobile computing device, etc.) and the remote devices (141, 151, and 161) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to the computing device 101. As an example, a security and integration layer 160 of a server 101 may comprise a set of web application servers configured to use secure protocols and to insulate the device 101 from external devices 141, 151, and 161. In some cases, the security and integration layer 160 may correspond to a set of dedicated hardware and/or software operating at the same physical location and under the control of same entities as device 101. For example, layer 160 may correspond to one or more dedicated web servers and network hardware in a vehicle and driver information datacenter or in a cloud infrastructure supporting a cloud-based vehicle identification and vehicle and driver data retrieval and analysis. In other examples, the security and integration layer 160 may correspond to separate hardware and software components which may be operated at a separate physical location and/or by a separate entity.

As discussed below, the data transferred to and from various devices in an electronic display system 100 may include secure and sensitive data, such as confidential vehicle data, insurance data, and personal user data from drivers and passengers. Therefore, it may be desirable to protect transmissions of such data by using secure network protocols and encryption, and also to protect the integrity of the data when stored on within an electronic display system, intermediary server, external data source servers, user devices, on-board vehicle devices, or other computing devices in the system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in an electronic display system 100. Data may be transmitted through the security and integration layer 160, using various network communication protocols. Secure data transmission protocols and/or encryption may be used in file transfers to protect to integrity of the data, for example, File Transfer Protocol (FTP), Secure File Transfer Protocol (SFTP), and/or Pretty Good Privacy (PGP) encryption. In other examples, one or more web services may be implemented within the various devices 101 in the system 100 and/or the security and integration layer 160. The web services may be accessed by authorized external devices and users to support input, extraction, and manipulation of the data (e.g., vehicle and passenger data) between the various devices 101 in the system 100. Web services built to support an electronic display system may be cross-domain and/or cross-platform, and may be built for enterprise use. Such web services may be developed in accordance with various web service standards, such as the Web Service Interoperability (WS-I) guidelines. In some examples, an vehicle or individual data analysis web service, a digital content determination or offer web service, or an advertiser auction web service may be implemented in the security and integration layer 160 using the Secure Sockets Layer (SSL) or Transport Layer Security (TLS) protocol to provide secure connections between servers 101 and various clients 141, 151, and 161 (e.g., user mobile devices, vehicle-based devices, or other computing devices). SSL or TLS may use HTTP or HTTPS to provide authentication and confidentiality. In other examples, such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a database of vehicle or passenger-related data from various data sources) is cached in a separate smaller database on an application server separate from the database server (e.g., at an intermediary server, advertising server, electronic roadside display, or other display device). For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of electronic display systems, such as faster response times and less dependence on network conditions when transmitting/receiving information to identify vehicles, retrieve vehicle and individual data, and determine digital content to display to vehicles, etc.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and electronic display systems components described herein may be configured to communicate using any of these network protocols or technologies.

Additionally, one or more application programs 119 may be used by the various computing devices 101 within an electronic display system 100 (e.g., vehicle or individual data analysis software applications, advertiser auction software applications, etc.), including computer executable instructions for identifying vehicles approaching electronic displays, retrieving and/or determining various vehicle and individual characteristics of the approaching vehicles, determining and displaying digital content on electronic displays based on the characteristics of the approaching vehicles and individuals.

Figure 2:
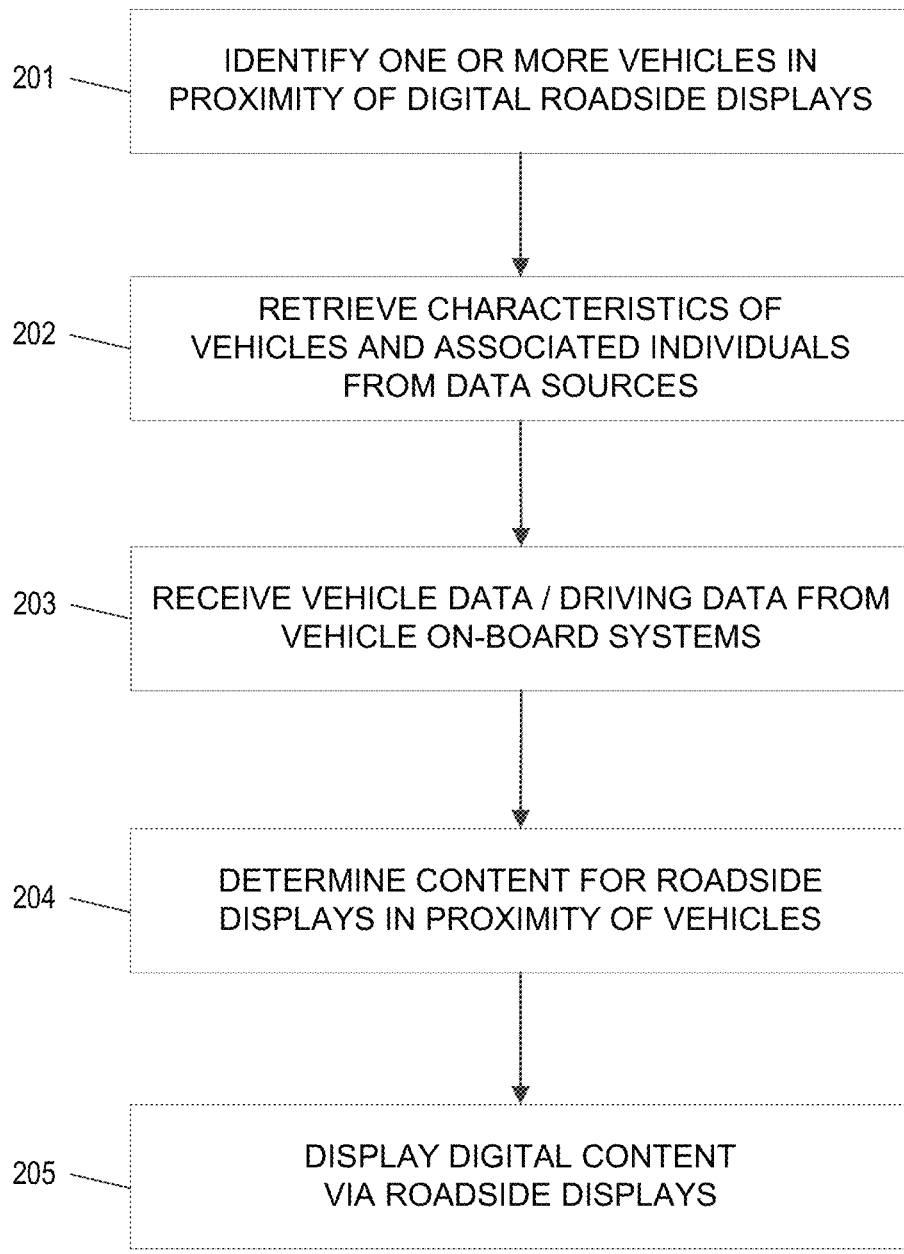
FIG. 2 is a flow diagram illustrating an example method of displaying digital content via roadside displays based on vehicle and individual characteristics and/or driving data, according to one or more aspects of the disclosure.

FIG. 2 is a flow diagram illustrating an example method of displaying digital content via roadside displays, based on the characteristics of one or more approaching vehicles and/or associated individuals. The various embodiments and examples described in connection with FIG. 2 may be implemented using a number of computing systems, operating individually or in combination, such as electronic roadside displays, on-board vehicle systems, intermediary servers and other computing devices. Different examples of components and configurations for electronic roadside display systems are shown in FIGS. 3A-3D, described below. Each of computing devices and systems in these examples may include some or all of hardware, software, and networking components as the illustrative computing device 101 described in FIG. 1.

In step 201, one or more vehicles are identified as being in the proximity of one or more electronic roadside displays. The identification of a vehicle in step 201 may be based on a determination that the vehicle is currently near or approaching an electronic roadside display, or that the vehicle is likely to be near the electronic roadside display at some future point in time. Accordingly, the identification of a vehicle in step 201 may include receiving or determining the current locations, speeds, directions of travel, roads and routes being driven, and intended or anticipated destinations for a number of vehicles. This data may be analyzed and compared to the locations of the electronic roadside displays (e.g., LED billboards and other electronic signs) that are controllable by the electronic roadside display system.

Determinations that a vehicle is near or approaching an electronic roadside display, or that it will be near an electronic roadside display in the near future, may be performed in various different ways, either by a single computing device or a combination of multiple devices in an electronic roadside display system. For example, a computing device or system positioned along a roadside may use cameras, motion sensors and proximity sensors to detect the approach of a vehicle and retrieve identifying information for the vehicle and/or passengers. For instance, a roadside motion detector and camera system located at or near electronic roadside display may be able to detect approaching vehicles and receive vehicle-specific identification information, such as the vehicle's license plate number and state, VIN, registration tag, etc.

In other examples, one or more on-board vehicle computing devices, such as vehicle console computing systems, vehicle navigation systems, vehicle diagnostic systems, vehicle telematics devices, and the personal mobile devices of drivers and passengers in the vehicle, may be used to determine vehicle location, speed, direction, roads/routes being driven, and destination. An on-board vehicle system may be configured with vehicle-to-vehicle (V2V) or vehicle-to-infrastructure (V2I) communication capabilities, and may communicate with other vehicles or roadside computing devices via digital short-range communication (DRSC) or other communication protocols to indicate its position, speed, direction, etc. On-board or vehicle-based systems may include in-vehicle electronics, plug-in vehicle electronics and accessories, and/or after-market devices, such as vehicle navigation systems, telematics devices, on-board devices (OBDs), and the like. The smartphones and other mobile devices of drivers or passengers also may include Global Positioning System (GPS) receivers or other location-based services (LBS) capable of determining vehicle location, speed, and/or direction, etc. Other wireless technologies, such as mobile communication networks, Wi-Fi, and Bluetooth, also may be used to determine vehicle locations, speeds, and directions, etc. In some cases, on-board vehicle computing systems may transmit the vehicle's location, speed, direction, and other data over short distances to nearby electronic roadside displays to indicate that the vehicle is approaching the electronic display. In other examples, on-board vehicle computing systems may transmit the vehicle's location, speed, direction, and other data to intermediary servers and other communication networks that may collect and analyze the information to identify one or more electronic roadside displays that the vehicle is approaching.

In addition to a vehicle's current location, speed, and direction data, additional data from on-board computer systems, driver or passenger mobile devices, or other data sources, may be received and analyzed in step 201 to make longer-ranging predictions about the future positions of the vehicle. For example, a vehicle navigation system or a user's smartphone may contain the current trip destination. Additionally, vehicle telematics devices or other systems internal or external to the vehicle may store driving pattern data and previous driving trip logs, from which the current trip destination may be determined. After determining a likely destination of the current driving trip, the destination can be transmitted and analyzed to identify one or more electronic roadside displays that the vehicle is likely to encounter during the driving trip. For example, if a driver inputs a current destination into a vehicle's navigation system (or their smartphone), or if a pattern analysis of the previous driving trips for the vehicle and/or driver can be used determine the destination of the current driving trip, then the anticipated driving route may be analyzed to identify electronic display along the route and the anticipated time that the vehicle will arrive at each electronic display.

In step 202, for the vehicles identified in step 201, one or more data sources may be accessed to retrieve characteristics of the vehicles and various individuals associated with the vehicles (e.g., drivers, passengers, owners, etc.). As discussed in more detail below, the vehicle and individual characteristics retrieved in step 202 may be used in step 204 to determine the digital content (e.g., an advertisement or other message) to present to the vehicle via the electronic roadside displays. Therefore, the vehicle and individual characteristics retrieved in step 202 may include demographic data, financial data, insurance data, educational data, family data, personal data, and other types of relevant data that may be retrieved from various data sources. Several examples of data sources, and the types of data that may be retrieved from the example data sources, are described below in connection with FIG. 6.

The vehicle data retrieved in step 202 may be based on vehicle identifier information captured by roadside cameras (e.g., a vehicle's license plate data) or transmitted by an on-board vehicle device (e.g., vehicle registration data, VIN, or vehicle identifier transmitted during a V2V or V2I communication). Based on the vehicle identifier information, one or more data sources may be accessed to retrieve additional vehicle-specific data, such as the vehicle's make and model, last recorded mileage, maintenance history, emissions history, estimated value, registered owners, and other insured drivers.

The individual data retrieved in step 202 may correspond to the current occupants of the vehicles identified in step 201 (e.g., drivers and passengers), or individuals otherwise associated with the vehicles (e.g., vehicle owners, family members, other drivers, etc.). In some cases, the relevant individuals may be determined based on the retrieved vehicle data. For example, a vehicle identifier (e.g., license plate, VIN, etc.) may be used to identify the vehicle's owners, other drivers, and family members that may be passengers in the vehicle. In some cases, data identifying the vehicle's occupants also may be transmitted by an on-board vehicle device (e.g., vehicle computer or user's mobile device). For instance, a user may be identified as a driver or passenger in a vehicle based on transmissions from the user's smartphone to another device in an electronic roadside display system. Additionally, certain vehicle-based computer systems may include the capabilities to detect the identities of the driver and passengers during a driving trip, and may transmit the identities to another device in the electronic roadside display system. In each of the above examples, after identifying the occupants of the vehicle and/or other individuals associated with the vehicle, one or more data sources may be accessed to retrieve demographic data, financial data, personal data, and the like, for each of the identified individuals.

In some cases, additional data from traffic cameras or other roadside cameras may be used in combination with the vehicle and individual data retrieved from data sources. For example, after accessing an external data source (e.g., an insurance server or governmental vehicle registration server) to determine that a vehicle has two owners, images from roadside cameras may be analyzed to determine which of the two owners, if either, is currently driving. Vehicle sensor data transmitted from an on-board vehicle device (e.g., internal cabin camera data, driver seat settings, radio settings, etc.) also may be used to identify current drivers and passengers.

In step 203, for the vehicles identified in step 201, additional vehicle data and/or driving data may be received from one or more on-board vehicle systems, such as a vehicle-based on computing device or a portable computing device of a driver or passenger. For example, certain vehicle-based systems (e.g., vehicle computers, diagnostic systems, or telematics devices, etc.) may be configured to detect and store vehicle maintenance records, vehicle maintenance plans and schedules, vehicle diagnostics data, vehicle impacts, safety warnings, and other data generated by a vehicle's internal computer systems. After being collected by a vehicle-based system, this maintenance and diagnostic data may be transmitted to an electronic roadside display system (e.g., via a V2I protocol), an intermediary computer server (e.g., via a mobile communication network), or other device in an electronic roadside display system.

Additionally, a vehicle-based system or personal mobile computing device (e.g., a smartphone or tablet computer of an occupant) may be configured to detect certain driving behaviors and driving patterns, such as speeding or excessively slow driving, swerving, erratic driving, and moving violations committed by the vehicle. These devices also may collect driving pattern data for one or more specifics vehicle and/or drivers over multiple driving trips. Driving pattern data may include previous driving times, starting points, ending points, and driving routes taken during previous driving trips of a vehicle and/or driver. Additional driving pattern data may include driving behaviors and driving performance metrics, such as average speeds, acceleration and braking patterns, turning and curve handling patterns, turn-signal usage, radio usage, and the like. Driving behaviors and patterns from the current trip may be compared to driving behaviors and patterns from previous trips to determine if the driver is driving hurriedly, cautiously, erratically, or in a high-risk manner compared to the typical driving behaviors and patterns of the driver and/or vehicle. After collecting driving behaviors and driving pattern data, the on-board vehicle devices may transmit this data to an electronic roadside display system (e.g., via a V2I protocol), an intermediary computer server (e.g., via a mobile communication network), or other device in an electronic roadside display system.

In step 204, the vehicle and individual characteristics retrieved from various data sources in step 202, and the vehicle and driving data received from various on-board vehicle systems in step 203, may be analyzed to select specific digital content to display on an electronic roadside display at a specific time. Selected digital content for an electronic roadside display may include, for example, targeted advertisements, vehicle maintenance suggestions, driving safety warnings, and notifications about upcoming driving conditions. In various examples, the digital content determined in step 204 may be based solely on the vehicle and individual characteristics retrieved from one or more data sources in step 202, or solely on the vehicle and driving data received in step 203, or a combination of both types of data.

A portion of the analysis in step 204 may include determining beginning and ending times for specific digital content (e.g., an advertisement or other message) to be displayed on an electronic roadside display. If the digital content is targeted for individuals within a single vehicle, then the beginning display time and ending display time may correspond to the earliest and latest times that content on the roadside display will be visible to the vehicle's occupants. These times may be calculated based on the relative positions and orientations of the vehicle and the electronic roadside display, the speed of the vehicle, the size of the electronic roadside display (including font and image size of the specific content to be displayed), and measurements of the current outdoor visibility (e.g., based on the current time of day, weather conditions, etc.). As discussed above, the vehicle's location, speed, orientation, and direction of travel may be determined from various sources, such as V2I communications, GPS or LBS data, mobile communication networks, roadside traffic cameras and on-board vehicle cameras, and the like. Vehicle location, speed, and direction data also may be predicted using driving pattern data or intended destination data received from on-board vehicle systems or other data sources.

In other examples, digital content might not be targeted for individuals within a single vehicle, but instead may be determined based on an analysis of multiple vehicles and individuals that will be in the proximity of an electronic roadside display at or near the same time. Additionally, a first selected digital content may be replaced by a different selected digital content after a first set of targeted vehicles and individuals have driven past and are no longer in view of the electronic display, and a new set of vehicles and individuals is approaching or in view of the electronic display. In these examples, the beginning and ending times for displaying specific digital content may be selected by determining the times that will maximize the potential viewing time of targeted individuals to the digital content selected for those individuals.

The digital content selected in step 204 for displaying on an electronic roadside display device may include advertisements selected based on analyses of the data received in steps 202 and/or 203. For example, targeted advertisements may be selected based on vehicle and individual characteristics retrieved from various data sources in step 202, such as demographic data, family data, financial and past purchasing data, educational data, insurance data, and the like. For example, if the vehicle and individual data retrieved in 202 indicates that the vehicles approaching a certain roadside display contain a large proportion of teenage occupants, then a targeted advertisement may be selected to appeal to that demographic. Similarly, if the retrieved data indicates that the approaching individuals include large proportions of individuals from certain economic categories, demographic characteristics (e.g., age ranges, marital statuses, children, etc.), educational or occupational characteristics, previous purchasing histories, or other characteristics, then the digital advertisements selected in step 204 may be targeted to those characteristics. Vehicle characteristics also may be used, in addition to or instead of individual characteristics, to select targeted advertisements in step 204. For instance, the make, model, and year of a vehicle may indicate likely ages, socio-economic characteristics, and hobbies and interests of the vehicle's occupants, which may be used to select targeted advertisements for roadside displays. Additional examples of the types of data that may be retrieved from various data sources, and the types of targeted advertisements or other targeted messages that may be displayed based on the retrieved data, are described below in connection with FIG. 6.

In addition to the vehicle and/or individual characteristics retrieved in step 202, the driving routes and intended destinations of the vehicles also may be used to select a targeted advertisement for a roadside display in step 204. As discussed above, anticipated driving route and destination information may be received or predicted from various sources, such as vehicle navigation systems, a driver or passenger's smartphone, the driver's home and work address data (e.g., retrieved from a governmental server, insurance server, etc.), or driving patterns and previous driving trip logs stored on the vehicle or separate from the vehicle. After analyzing this data to determine or predict a vehicle's anticipated driving route or intended destination, targeted advertisements may be selected based on the vehicle and individual characteristics as well as the anticipated driving route and intended destination. For example, if a target product (e.g., camping equipment) is selected based on the individual characteristics retrieved for the occupants of an approaching vehicle, then the anticipated driving route and destination of the vehicle may be used to select an advertisement for a camping equipment store along the anticipated driving route of the vehicle.

Certain targeted advertisements determined in step 204 also may be based on current trip driving data and/or previous trip driving data received from a vehicle on-board computing device or other system. For example, if the current trip data received from an on-board computing device (e.g., vehicle-based computer or smartphone) indicates that the vehicle is coming from a park, golf course, or other recreational activity, then a targeted advertisement may be selected for a restaurant, coffee shop, or convenience store, and the advertisement may specifically suggest post-activity food or refreshments for the occupants in the vehicle. As another example, if the current trip data received from an on-board computing device indicates that the vehicle is on a long-distance road trip, then this information may be used along with other determined individual characteristics to suggest a nearby rest stop, restaurant, or hotel.

In still other examples, vehicle and individual characteristics may be used in combination with driving behaviors and patterns to determine targeted offers to drivers. For example, an insurance provider may receive and analyze vehicle and individual characteristics (e.g., vehicle make and model, mileage, condition, driver age, driving record, etc.) for a vehicle approaching a roadside display. Along with the vehicle and individual data received from various data sources, the insurance provider also may retrieve data from an on-board computing device or other database corresponding to the vehicle's driving data during the current trip and/or previous trips (e.g., safe or high-risk driving behaviors, accidents or near-accidents, instances of high-speed skidding or swerving, detections of moving violations, etc.). Based on the vehicle and individual characteristics, along with the driving data, the insurance company may determine a customized insurance offer for the driver in step 204. A customized insurance offer may, for example, identify the specific vehicle or driver by name, and include an insurance rate quote, discount, incentive, or other terms to display to the driver via the roadside display (e.g., "Hello [CUSTOMER NAME]! We at [INSURANCE COMPANY] appreciate your safe and accident-free driving. Switch today to [INSURANCE COMPANY] and you will receive a [RATE or DISCOUNT DETAILS], guaranteed!! Visit [WEBSITE] or call [AGENT NAME AND NUMBER] to redeem this offer!").

In addition to targeted advertisements, other types of digital content may be determined in step 204, including notifications, warnings, and other messages to drivers relating to vehicle maintenance, driving safety, road conditions, and the like. For example, the vehicle diagnostics, sensor data, and maintenance-related data retrieved in step 203 may be used to provide maintenance warnings and suggestions to drivers via roadside electronic displays. Thus, if a vehicle's internal sensors detect that the vehicle is low on fuel, coolant, or wiper fluid, or if the vehicle needs air in one of its tires, has a flat tire, is overdue due for an oil change, needs an alignment, or has any other maintenance issue detectable by the vehicle's sensors, then an on-board computing system may transmit this information to an electronic roadside display system, so that an appropriate message, warning, or offer may be determined for the vehicle. In such examples, the digital content determined in step 204 may include an advertisement for a local gas station, tire shop, auto mechanic, or other business, including directions and relevant offers (e.g., "Almost out of gas, take Exit 217," "Oil changes, $19.99," "Free air with any fill-up," etc.).

Additional messages determined in step 204 may include customized warnings for drivers and targeted alerts relating to weather, traffic, road conditions, and other potential hazards. For example, if a vehicle-based device or personal mobile device has detected erratic driving behaviors by the driver of a vehicle, these erratic behaviors may be transmitted to the electronic roadside display system and an appropriate driving alert or warning message may be determined in step 204. For instance, driving speed, curve-handling, lane position, radio usage, signal usage, time of day, trip starting point, and other driving trip data may be used to identify drivers that may be intoxicated, texting or talking while driving, beginning to fall asleep while driving, excessively speeding or racing, or engaging in other high-risk driving behaviors. If a determination is made that a driver may be driving in an impaired state or other high-risk manner, then customized content may be determined for the driver in step 204, for example, a red flashing alert warning the driver that their erratic driving has been detected, a suggestion that the driver pay greater attention, pull over to sleep, call a friend or taxi service, etc.

Other possible content determined in step 204 may include messages or alerts based on the vehicle-specific and/or driver-specific data received in steps 202 and 203, along with weather data, traffic data, road condition data, and the like. For example, a vehicle's anticipated driving route and intended destination, which may be received or determined as discussed above using on-board vehicle systems and other data sources, may be used to alert drivers to weather issues, traffic issues, or road condition issues that are specific to the driver's anticipated driving route and intended destination. For instance, an electronic roadside display may be located on Highway ABC, 1 mile before the exit for Road XYZ. As a vehicle approaches the electronic roadside display, the anticipated driving route and intended destination of the vehicle may be determined using the vehicle and individual data received in steps 202 and 203. Based on the anticipated driving route and intended destination of the vehicle, if the vehicle is likely to exit Highway ABC and travel west on Road XYZ, then the traffic, weather, and road condition alerts for westbound Road XYZ may be displayed on the electronic roadside display. Similarly, if the vehicle is likely to exit Highway ABC and travel east on Road XYZ, or is likely to continue on Highway ABC, then different sets of traffic, weather, and road condition alerts may be displayed on the electronic roadside display.

As discussed above, digital content might not be targeted for individuals within a single vehicle, but instead may be determined based on an analysis of multiple vehicles and individuals that are near an electronic roadside display at or around the same time. On a road or highway with moderate to heavy traffic, an electronic roadside display is likely to be visible to several different cars at any given time. In such cases, the determination of the digital content for the electronic roadside display in step 204 may include collecting and analyzing the various types of data concurrently for multiple different vehicles and individuals. In some cases, common characteristics among the vehicle and individual data received in steps 202 and 203 may be aggregated and compared against other characteristics to determine the digital content in step 204. As an example, a group of five vehicles may be driving near each other on the same road, and the vehicles may approach a roadside display at around the same time. If the five vehicles contain a combined total of 12 women and 4 men, then an advertisement targeted for women may be selected, instead of an advertisement targeted for men, for displaying to this group of vehicles. As another example, if a group of approaching cars contains similar numbers of men and women, but the vehicle occupants are predominately under 30 years old, then an advertisement targeted for a younger demographic may be selected in step 204. Similar aggregation techniques may be used for any of the vehicle characteristics or individual characteristics discussed above, including demographic, educational, occupational, economic, and/or personal characteristics associated with vehicles or individuals. Such aggregation techniques also may be used on the vehicle data (e.g., diagnostic or maintenance data) or the driving data (e.g., driving speeds, anticipated driving routes and destinations, etc.). For instance, if several vehicles in a group of vehicles approaching a roadside display are low on gas, or need air in their tires, then an advertisement for a nearby gas station with free air may be selected, whereas if only one of the vehicles is low on gas and needed air in its tires, then a different advertisement may be selected. As other example, if multiple vehicles in an approaching group of vehicles have approximately the same anticipated driving route, then an advertisement may be selected in step 204 for a business located on or near that driving route.

When determining digital content for a single approaching vehicle or a group of vehicles, certain characteristics may be weighted or prioritized more than other characteristics. For example, a group of vehicles approaching an electronic roadside display may consist of 75% women, and 40% soccer fans. In this example, although the percentage of women in the group of vehicles is higher than the percentage of soccer fans, an advertiser may consider the 40% of soccer fans to be a more important group characteristic with a higher effective rate of a targeted advertisement. Thus, in this example, an advertisement for an upcoming soccer exhibition match at a local stadium may be selected for display the group of vehicles, instead of an advertisement targeted specifically to women, based on the expected financial return of the advertisement targeted to soccer fans.

As the above examples illustrate, certain advertisers may place different values on certain vehicle characteristics and individual characteristics. Additionally, some advertisers may seek opportunities to advertise to large numbers of people across multiple demographic and economic categories, while other advertisers may be more interested in advertising to small groups with specific desired sets of characteristics. Accordingly, in some embodiments, an electronic roadside display system may implement a real-time auction in which multiple different advertisers may compete to have their advertisements displayed on a roadside display, based on the characteristic profile of a set of vehicles approaching a roadside display. A characteristic profile may include a comprehensive listing of the characteristics of a set of individuals in a group of one or more vehicles. Thus, in step 204, a set of vehicle characteristics and individual characteristics may be compiled based on the data received in steps 202 and 203, and the compiled set of characteristics may be provided to one or more advertisers who may bid for the right to display a specific advertisement to the group of approaching vehicles. In some cases, there may be very little time between when the vehicle and individual characteristics for a group of vehicles is identified, and when those vehicles are in viewing range of an electronic display. Therefore, for some real-time auctions, the bids submitted by advertisers corresponding to different characteristic profiles for groups of approaching vehicles may be submitted in advance and stored at one or more devices within an electronic roadside display system. For instance, one advertiser may pre-submit a bid indicating that they will pay a specified amount to display an advertisement to any group of vehicles including of three or more pickup truck drivers, while another advertiser may pre-submit a bid indicating that they will pay a different amount to display an advertisement to any group of vehicles including at least five parents of children under the age of ten. In this example, when a group of vehicles approaches an electronic display in the system includes three pickup truck drivers and five parents of young children, the real-time auction software application will execute to select the advertiser that bid the largest amount for their desired demographic profile. In some examples, the bids submitted by advertisers in such auctions may be per-person bids, such that the amount of the bid is determined dynamically based on the number of individuals in the approaching group that satisfy certain characteristic criteria (e.g., X dollars per pickup truck owner, Y dollars per parent, etc.).

Similarly, when the digital content determined in step 204 is something other than an advertisement, different weights and priorities still may be attached to different individual characteristics, as well as to different types of vehicle data and driving data received from on-board vehicle systems and other data sources. For example, a determination based on driving data that a driver may be driving while tired, distracted, or intoxicated may be prioritized over vehicle diagnostic data indicated that the some vehicle or another nearby vehicle is in need of an oil change. Thus, in this example, an alert directed to the tired, distracted, or intoxicated driver may be selected for displaying on the electronic display, instead of a suggestion for an oil change or other advertisement for another driver.

In step 205, the digital content determined in step 204 may be displayed on the appropriate electronic roadside display at the appropriate times to be viewable by the vehicles and individuals for which the data was received in steps 202 and 203.

Referring now to FIGS. 3A-3D, four diagrams are shown illustrating various different components and configurations in certain examples of electronic roadside display systems. Each of computing devices and systems shown in FIGS. 3A-3D may include some or all of hardware, software, and networking components described in the illustrative computing device 101 of FIG. 1. Additionally, each of the computing devices and systems illustrated in FIG. 3A-3D may perform, individually or in combination with other system components, the method steps discussed in connection FIG. 2, and in other examples and embodiments described herein. Additionally, although each of the examples in FIGS. 3A-3D shows that digital content may be displayed on an electronic roadside display, it should be understood that in other examples, digital content may be determined similarly and displayed on other types of (non-roadside) display devices, such as vehicle-based devices, personal mobile devices, televisions, home computing devices, and the like, as discussed below in FIGS. 4-7.

Figure 3A:
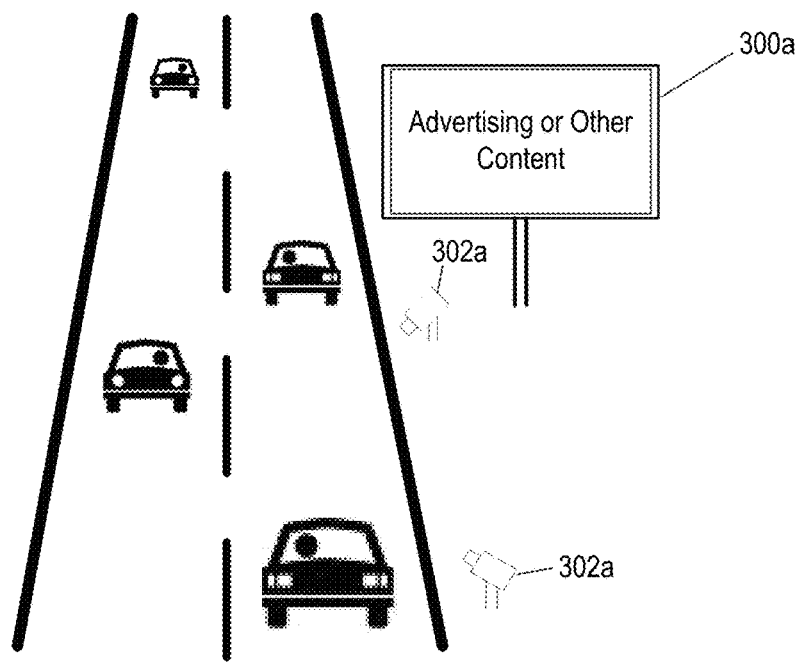
FIGS. 3A-3D are diagrams illustrating various combinations of components and configurations in certain examples of electronic display systems, according to one or more aspects of the disclosure.

In FIG. 3A, a diagram is shown of an example electronic roadside display system including an electronic display 300a, and one or more roadside or traffic cameras 302a. In this example, a control unit (e.g., including processor, memory, network interface, etc.) located at or near the electronic display 300a may receive image and video data from traffic cameras 302a. The image and video data may be used to detect vehicles approaching an electronic display 300a, and identify various features and characteristics of the approaching vehicles and the occupants within the vehicles. For instance, image analysis software at the traffic 302a or electronic display 300a may be used to identify the number of passengers, estimate the ages and genders of passengers, identify other visible passenger characteristics, identify the license plate by state and number, identify bumper stickers on the vehicle, post-factory vehicle modifications, and vehicle accessories such as ski or bike racks and luggage racks.

Instead of using traffic cameras 302a, or in combination with the traffic cameras, certain systems similar to those in FIG. 3A may include additional roadside sensors such as traffic counters, proximity sensors, and/or wireless transceivers (e.g., Bluetooth, Wi-Fi, and radio transceivers) that may be used to detect vehicles approaching the electronic display 300a and determine various vehicle and individual characteristics.

In addition to any vehicle and individual characteristics determined based on the image and video data from cameras 302a and other sensors, the system in FIG. 3A may include a local database to store and track additional characteristics and driving data. For example, a local data storage at the electronic display 300a may store data for passing vehicles, such as vehicle identifying information (e.g., license plate state and number), the time the date the vehicle passed the electronic display 300a, the vehicle's speed, acceleration, steering, and lane positioning, the number of passengers in the vehicle, etc. Each time a vehicle is detected approaching the electronic display 300a, the vehicle's identifying information may be identified and used to retrieve data from the local data storage relating to the vehicle's previous trips. The vehicle and driving data from the current trip may be compared to the vehicle's previous driving trips to determine additional information, for example, if the vehicle is speeding or driving erratically compared to its past trips, if the vehicle is driving the route at an unusual time or day compared to its past trips, if a different driver or different passengers are in the vehicle compared to its past trips, if the vehicle has new body damage since its past trip, etc.

After identifying one or more approaching vehicles, determining vehicle characteristics, individual characteristics, driving data, etc., as described above, a control unit at the electronic display 300a may determine digital content to display to the approaching vehicles on the electronic display 300a. As discussed above in step 204, the digital content may correspond to a targeted advertisement or other message based on the identified vehicle characteristics, individual characteristics, driving data, and the like, of the approaching cars.

Thus, in the example electronic roadside display system shown in FIG. 3A, the electronic display device 300a and/or other roadside devices may include processing units, memory units, and various other hardware and software components. Thus, the various steps discussed above in FIG. 2, such as identifying approaching vehicles, determining vehicle characteristics, individual characteristics, driving data, and the like, and determining and displaying digital content based on the characteristics of the approaching vehicles, along with the other examples and embodiments discussed herein, may be performed by an electronic display device 300a. In such systems, the electronic display 300a or other roadside devices may perform all functions of the system, without coordinating or communicating with any other devices, such as on-board vehicle devices or any other external servers.

Figure 3B:
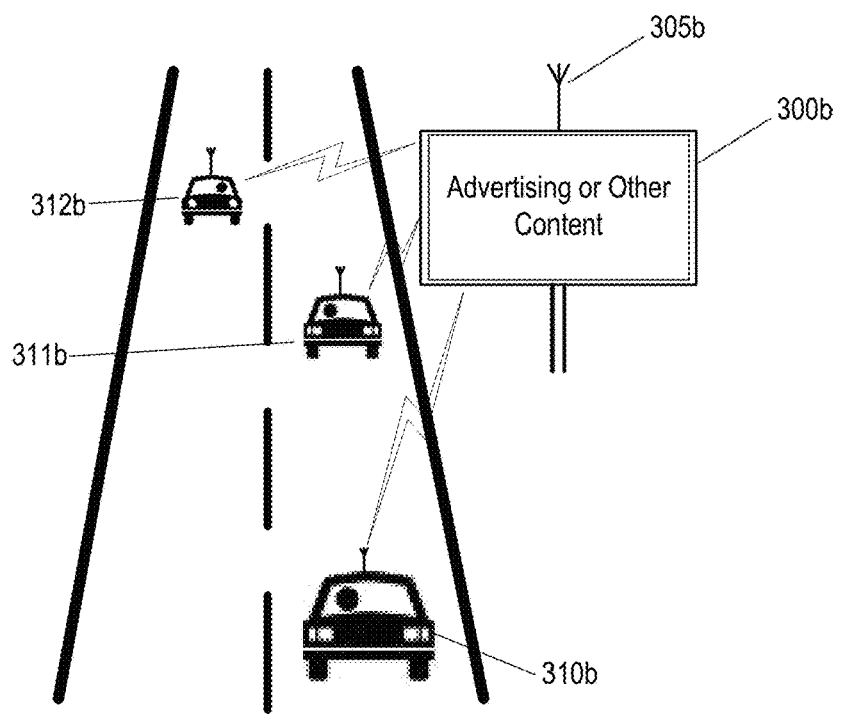

Referring now to FIG. 3B, a diagram is shown of another example electronic roadside display system including an electronic display 300b, and one or more on-board vehicle computing devices 310b-312b. In this example, the on-board vehicle computing devices 310b-312b may include vehicle-based systems (e.g., vehicle computers, navigation systems, telematics devices, etc.) or personal mobile devices of the vehicles' occupants (e.g., smartphones, tablet computers, etc.). These devices may be configured (e.g., via mobile software applications) to establish wireless communication session with electronic displays 300b positioned along roads and highways, which may be configured with antenna 305b to receive transmissions from nearby vehicles 310b-312b. Depending on the types of the on-board vehicle computing devices 310b-312b, various different protocols and techniques may be used for the wireless communication sessions, including V2V and V2I communications, Wi-Fi, Bluetooth, and various other mobile communications networks.

The example system shown in FIG. 3B may perform similar functions to those discussed above for the system FIG. 3A, in that both example systems may be configured to identify approaching vehicles, determine vehicle characteristics, individual characteristics, driving data, and the like, and determine and display digital content based on the characteristics of the approaching vehicles. However, in some cases, the on-board vehicle devices 310b-312b used in FIG. 3B may be configured to identify and transmit additional information that cannot be determined by the cameras 310a or other roadside sensors, such as the identities of the vehicle driver and passengers, specific driving data, anticipated destinations, driving patterns, and the like. On-board vehicle devices 310b-312b also may be configured to transmit data further in advance than data can be detected by traffic cameras 310a. This additional data from on-board vehicle devices 310b-312b, and the earlier availability of data from multiple vehicles, may allow the system of FIG. 3B to perform more detailed and robust determinations of the digital content for the electronic display 300b using the techniques discussed above in step 204.

In some cases, location, speed, and direction data from the on-board vehicle devices 310b-312b may be used to determine when the content on the electronic display 300b will be visible to the occupants of the different vehicles, allowing for more precise calculations for the beginning and ending times for displaying certain digital content. Additionally, the location, speed, and direction data may be used to identify vehicles that are traveling in the opposite direction (e.g., vehicle 312b), or traveling on a different nearby road (e.g., a highway frontage road) so that the electronic display 300b will not be visible to those vehicles, and data from those vehicles may be excluded from the selection of digital content.

In the example electronic roadside display system shown in FIG. 3B, the electronic display device 300b and/or on-board vehicle devices 310b-312b may include processing units, memory units, and various other hardware and software components configured to perform the functionality of the system. For example, any of the individual devices in FIG. 3B, or a combination these devices, may perform the steps discussed above in FIG. 2, including identifying approaching vehicles, determining vehicle characteristics, individual characteristics, driving data, and the like, and determining and displaying digital content based on the characteristics of the approaching vehicles. Thus, the electronic display 300b and/or on-board vehicle systems 310b-312b may perform all functions of the system without coordinating or communicating with any other devices, such as other external servers or data sources. In some cases, the analyses of vehicle characteristics, individual characteristics, driving data, etc., and the determination of the digital content to display on the electronic display 300b, may be performed entirely by an individual on-board vehicle device 310b, after which the determined content may be transmitted to the electronic display 300b.

Figure 3C:
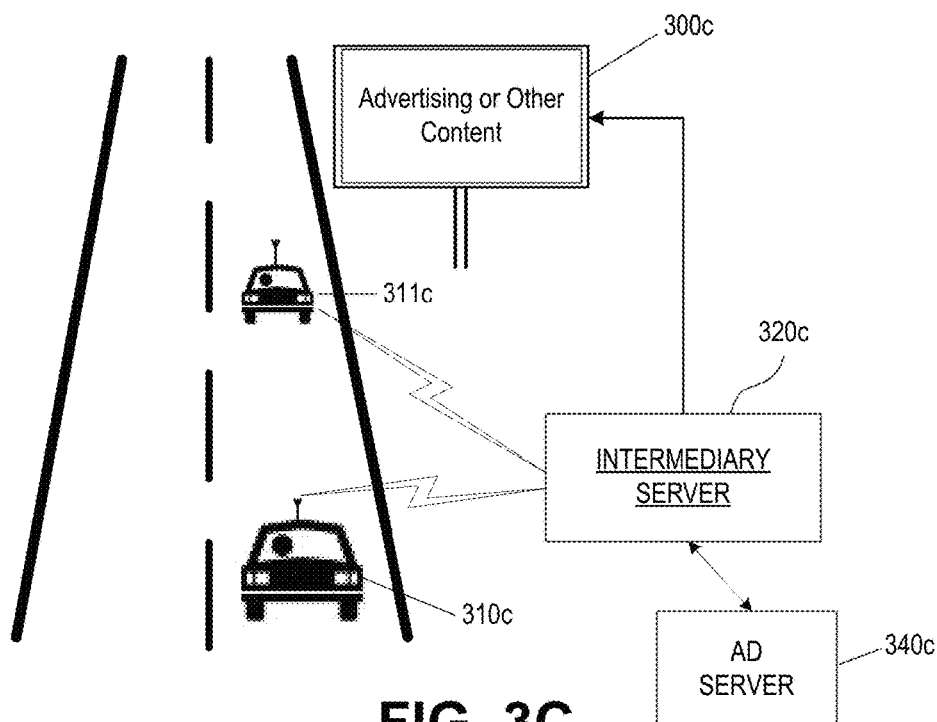

Referring now to FIG. 3C, a diagram is shown of another example electronic roadside display system including an electronic display 300c, an intermediary server 320c, and one or more on-board vehicle computing devices 310c-311c. In this example, the on-board vehicle computing devices 310c and 311c (e.g., vehicle-based systems or personal mobile devices) may wirelessly transmit vehicle identifier information (e.g., a license plate number, VIN, user name or mobile number, or other identifiers) to the intermediary server 320c, along with the vehicle's position, speed, and/or direction data. Depending on the types of the on-board vehicle computing devices 310c and 311c, various different protocols and techniques may be used for the wireless communication to the intermediary server 320c, including V2V and V2I communications, Wi-Fi, Bluetooth, and various other mobile communications networks. The intermediary server 320c may receive such transmissions from a plurality of vehicles, and may use the vehicle identifier information and location data to track the vehicles and to determine beginning and ending times for when vehicles 310c and 311c will be in viewing range of an electronic display 300c.

The intermediary server 320c may also receive various types of data (e.g., vehicle characteristics, individual characteristics, driving data, etc.) from the on-board vehicle devices 310c-311c, as described above in FIG. 2. In some cases, the intermediary server 320c also may use the vehicle identifier information to retrieve additional data from other data sources, such as a local data storage or remote data sources (e.g., data sources 320d). In some examples, the intermediary server also may receive instructions from one or more other devices, such as advertising server 340c. As discussed below in more detail, an advertising servers 340c may receive a characteristic profile of one or more approaching vehicles or individuals, and may instruct the intermediary server 320c (or may directly instruct the roadside display 300c) to display a particular advertisement or message. For instance, multiple advertising servers 340c may be connected to intermediary server 320c and/or roadside display 300c, and may perform real-time bidding based on the approaching vehicles and individuals. In certain embodiments, the intermediary servers may themselves be advertising servers 340c, or may be integrated with advertising servers 340c. Similar implementations and processes for intermediary servers and advertising servers may be used even when the digital advertisements or messages are not displayed on roadside displays, but instead on other types of digital displays (e.g., addressable computers and televisions, on-board vehicle devices, smartphones and other personal mobile devices, etc.), discussed below in FIG. 4.

After receiving the various vehicle and individual data from the on-board vehicle devices 310c-311c and/or other data sources, the intermediary server 320c may analyze the data and determine digital content for the electronic display 300c. Thus, in some examples, the intermediary server 320c in FIG. 3C may individually perform all of the steps discussed above in FIG. 2, by receiving data from on-board vehicle devices 310c-311c and determining digital content to transmit to electronic display 300c. In other examples, the intermediary server 320c may perform the various steps in combination with the on-board vehicle devices 310c-311c and/or one or more additional devices.

In some cases, an intermediary server 320c need not be tied to one specific electronic roadside display, but may be configured to receive data from many different on-board vehicle devices 310c, and determine digital content for many different electronic displays 300c. Additionally, for an intermediary server 320c connected to multiple different electronic displays 300c, the intermediary server 320c may be capable of using the different electronic displays in sequence to present certain users with multi-part targeted advertisements or other messages. For instance, intermediary server 320c may place a first portion of a multi-part advertisement on a first electronic display 300c as a targeted vehicle is driving past the first display. Later in the driving trip, when the vehicle approaches a second electronic display 300c also controlled by the intermediary server 320c, the intermediary server 320c may detect the approach of the vehicle and select the next portion of the multi-part advertisement to display via the second electronic display 300c. Using similar techniques, an intermediary server 320c may implement interactive targeted advertisements and messages, described in more detail below in FIG. 7.

Figure 3D:
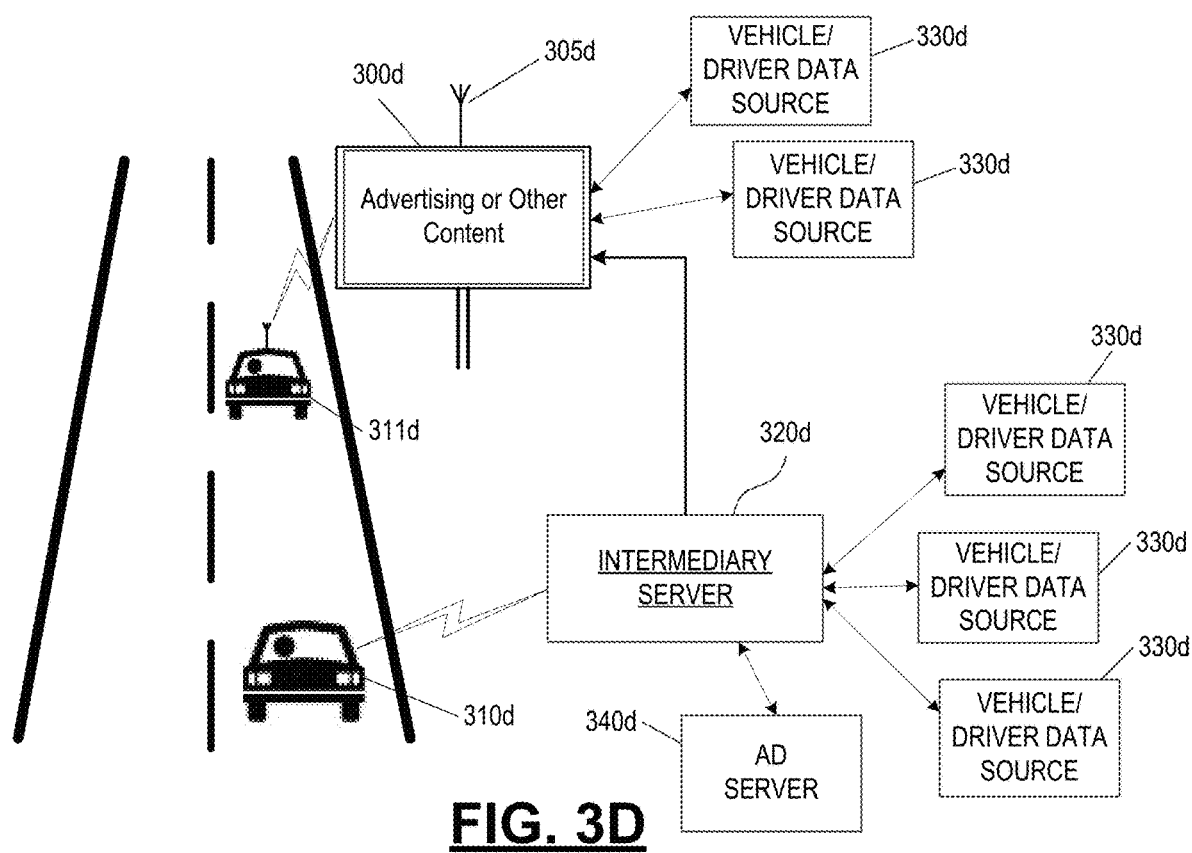

Referring now to FIG. 3D, a diagram is shown of another example electronic roadside display system including an electronic display 300d, an intermediary server 320d, an advertising server 340d, one or more on-board vehicle computing devices 310d-311d, and a plurality of data sources 330d. As discussed above in FIG. 3B, the electronic display 300d in this example may be configured with an antenna 305d to receive wireless transmissions from nearby vehicles 311d. Such transmissions may be sent by the on-board vehicle devices (e.g., vehicle-based computers, telematics devices, navigation systems, smartphones, etc.) using various different protocols and techniques, such as V2V and V2I communications, Wi-Fi, Bluetooth, and various other mobile communications networks. In this example, other on-board vehicle devices 310d may be configured to transmit data to an intermediary server 320d (e.g., via a mobile application of a smartphone or vehicle-based device), rather than transmitting data to the electronic display 300d. The intermediary server 320d may perform similar functions to those of intermediary server 320c in FIG. 3C. Thus, in this example, the determination of the digital content to display on the electronic display 300d may be performed at the electronic display 300d, the intermediary server 320d, or a combination of these devices and/or other system (e.g., on-board vehicle devices 310d-311d).

As shown in FIG. 3D, both electronic displays 300d positioned along roadsides, and intermediary servers 320d elsewhere, may communicated with various data sources to receive vehicle and individual characteristics, driving data and patterns, etc. For example, in some cases an on-board vehicle system 310d or 311d may be configured to transmit vehicle or user identification information (e.g., license plate number, VIN, registration number, insurance policy number, name and license number of vehicle owner, owner insurance account number, name and license number of driver, driver insurance account number, etc.), but might not transmit much (if any) additional vehicle characteristics, individual characteristics, driving data, etc. In such cases, an electronic display 300d or intermediary 320d may receive the vehicle and user identification information, and use this information to receive vehicle and individual characteristics, driving data, driving patterns, and various other types of data from data sources 330d. The data retrieved from data sources 330d may include demographic data, financial data, insurance data, educational data, family data, personal data, driving data, etc. Examples of data sources and types of data that may be retrieved from data sources are described below in reference to FIG. 6.

Figure 4:
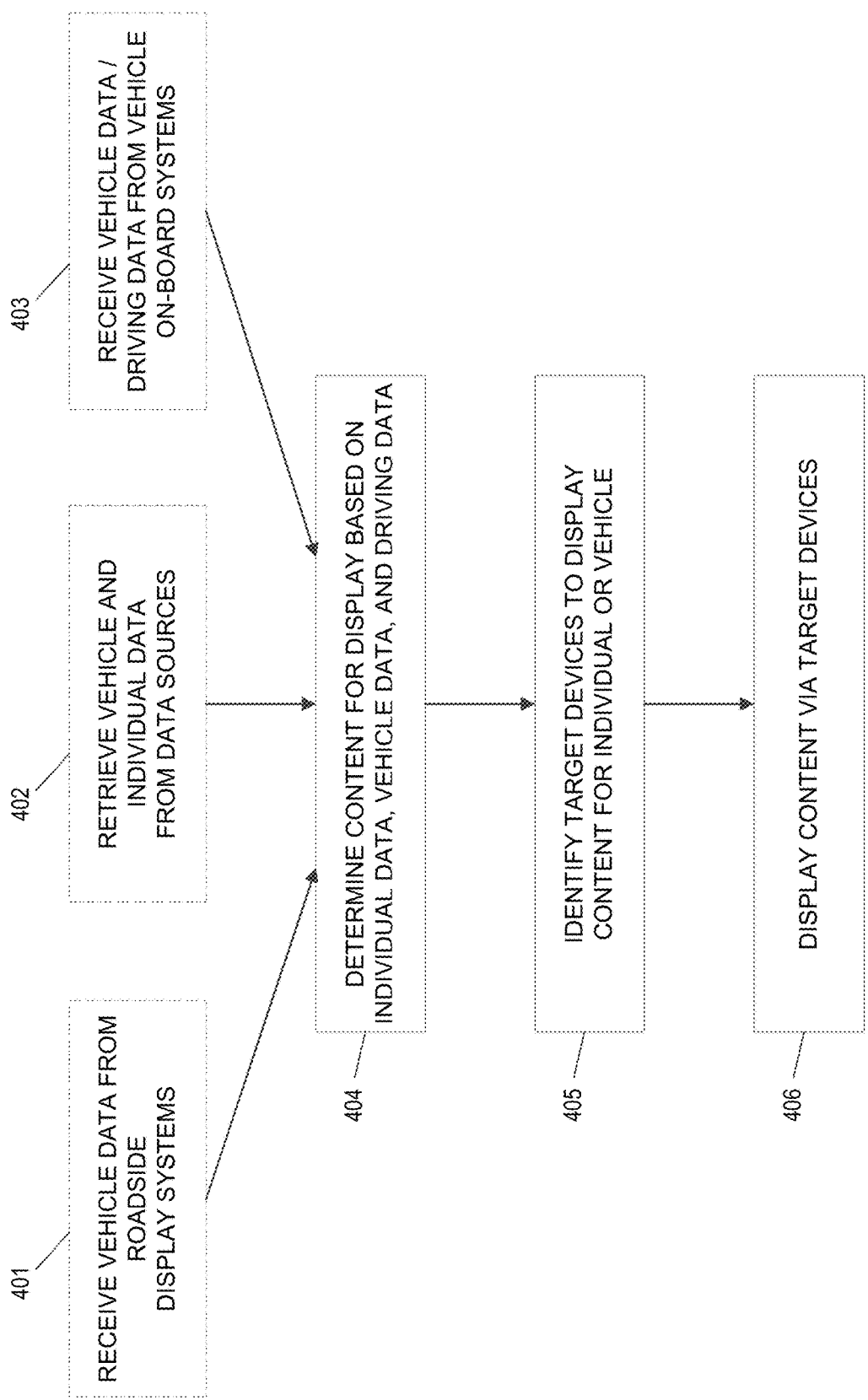
FIG. 4 is a flow diagram illustrating an example method of displaying digital content via electronic displays based on vehicle and individual characteristics and/or driving data, according to one or more aspects of the disclosure.

FIG. 4 is a flow diagram illustrating an example method of displaying digital content via electronic displays, based on vehicle and individual characteristics and/or driving data. The various embodiments and examples described in connection with FIG. 4 may be implemented using a number of computing systems, operating individually or in combination, such as various electronic displays, on-board vehicle systems, intermediary servers and other computing devices. Each of computing devices and systems in these examples may include some or all of hardware, software, and networking components as the illustrative computing device 101 described in FIG. 1.

Like the examples discussed above regarding FIG. 2, FIG. 4 relates to determining content that may be displayed to specific vehicles and/or individuals, based on vehicle data, individual data, driving data, and the like. However, while FIG. 2 describes examples in which the determined content is displayed via roadside displays, the examples in FIG. 4 include determining content that may be displayed on other (e.g., non-roadside) types of electronic displays. That is, the examples described below in FIG. 4 need not involve a roadside display and need not be performed while a vehicle is driving, but instead may involve one or more other types of display devices (e.g., home computers television receivers and set-top boxes, personal mobile devices, vehicle-based display devices), and may be performed before, during, or after a driving trip. For example, a targeted advertisement, vehicle maintenance message, driving safety message, or other digital content may be determined and displayed via a vehicle-based display, smartphone or other personal mobile device, home computer, television, or any other digital display. Thus, while there may be similarities with the steps of FIG. 2, differences may exist in the determinations and analyses described in FIG. 4, including the selection of a display device type (e.g., vehicle-based display, personal mobile device, home computer, television, etc.) the timing for displaying the digital content (e.g., before, during, or after a driving trip), the mechanisms for receiving user feedback in response to the displayed digital content, etc.

In steps 401-403, data relating to one or more vehicles and/or individuals may be received from various sources, including roadside display systems (step 401), data sources (step 402), and vehicle on-board systems (step 403). In steps 404-406, the data received in steps 401-403 may be analyzed to determine digital content to display (step 404), determine target devices on which to display the digital content (step 405), and then display the digital content on the target devices (step 406). As indicated in FIG. 4, each of steps 401-403 may be optional. Thus, in various different examples, digital content may be determined in step 404 based only data received from roadside display systems (step 401), based only on data received from data sources (step 402), based only on data vehicle on-board systems (step 403), or based on any combination of data received in steps 401-403.

In step 401, data may be received from one or more electronic roadside display systems (e.g., 300a-300d) relating to the vehicles or individuals near the electronic roadside displays. The data received in step 401 may be similar or identical to the data received in step 201, discussed above. For example, a computing device or system positioned along a roadside may use cameras, motion sensors and proximity sensors to detect the approach of a vehicle and retrieve identifying information for the vehicle and/or passengers. For instance, a roadside motion detector and camera system located near electronic roadside display may detect approaching vehicles and receive vehicle-specific identification information, such as the vehicle's license plate number and state, VIN, registration tag, etc. In addition to identifying a vehicle and/or individuals in a vehicle, roadside display systems may determine the current locations, speeds, directions of travel, roads and routes being driven, etc. As discussed above in step 201, electronic roadside display systems also may receive data from nearby vehicle-based systems and mobile computing devices of vehicle drivers or passengers. The data may relate to the vehicle, the vehicle's occupants, the vehicle's driving data, etc.

After collecting various vehicle information, individual information, and/or driving data in step 401, an electronic roadside display system may transmit this data, for example, to an intermediary server, advertising server, home computing device, personal mobile device, or vehicle-based device. Electronic roadside display systems may also transmit time and location data in step 401, to allow the receiving devices to determine when and where certain vehicles and individuals were detected by the roadside display systems.

In step 402, vehicle data, individual data, and/or driving data may be received from one or more data sources. Several examples of data sources, and the types of data that may be retrieved from the example data sources, are described below in connection with FIG. 6. The data received in step 402 may be similar or identical to the data received in step 202, discussed above. However, the data retrieved from data sources in step 402 need not correspond to the detection of a vehicle or individual approaching a roadside display, as in step 202. For example, one or more data sources may be accessed in step 402 to retrieve demographic data, financial data, insurance data, educational data, family data, personal data, and other types of relevant data relating to vehicles and/or individuals associated with vehicles (e.g., drivers, owners, etc.), regardless of whether those vehicles are currently being driven. The data sources may be accessed various examples by intermediary servers, advertising servers, home computing devices, personal mobile devices, or vehicle-based devices, etc., to retrieve vehicle information, individual information, and/or driving data in step 402.

In step 403, vehicle data, individual data, and/or driving data may be received from one or more on-board vehicle systems, such as vehicle-based devices (vehicle computers, telematics devices, navigation devices, plug-in devices, aftermarket devices, etc.) and mobile phones or other personal mobile devices within vehicles. The data received in step 403 may be similar or identical to the data received in step 203, discussed above. However, the data retrieved from vehicle-based devices and/or mobile computing devices in step 403 need not correspond to vehicles or individuals currently driving or approaching roadside displays. Instead, the vehicle data, individual data, and/or driving data received in step 403 may be transmitted at times and places not corresponding to driving trips. For example, vehicle and driving data may be transmitted in step 403 before or after driving trips, according to a predetermined schedule (e.g., hourly, daily, weekly, etc.) or when a vehicle-based or mobile device returns home and syncs with a master device, etc.

In step 404, one or more computing devices in an electronic display system may determine digital content to display to the vehicles and/or individuals based on the data received in steps 401-403. Step 404 may be performed by, for example, an intermediary server, advertising server, home computing device, personal mobile device, home television system (e.g., set-top box or television content provider), or the like. The determination of digital content for specific vehicles and/or individuals in step 404 may be similar or identical to the determination of digital content in step 202, discussed above. For example, a targeted advertisement, vehicle maintenance warning, driving safety message, or other digital content may be selected for one or more vehicles and/or individuals based on the analysis of the data received in steps 401-403. However, in step 404, the determined digital content might not be selected for display via a roadside display system as in FIG. 2, but instead may be selected for display via one or more personal mobile devices (e.g., smartphones or tablet computers), vehicle-based devices, home computers or televisions, etc. Additionally, the digital content in step 204 may be selected for presenting to a user during a driving trip, whereas the digital content selected in step 404 may be presented via the various devices before, during, and/or after driving trips.

In step 405, the electronic display system may identify one or more target devices on which to display the digital content determined for the vehicle and/or individual in step 404. For example, after analyzing the various data received in steps 401-403, and determining the digital content in step 404, an intermediary server, advertising server, or other computing device may retrieve a previously stored list of display devices associated with the vehicle(s) and/or individual(s) and select one or more of the display devices on which to display the content. In some cases, an on-board vehicle device (e.g., vehicle-based display or personal mobile device) may be selected in step 404. In other cases, another computing device or online account may be selected in step 404. For example, an individual's physical address and/or television broadcast account information may be retrieved (e.g., from a vehicle registration database or other data source 300*b*) and used to insert a customized television commercial into the individual's television broadcast stream. In other examples, an individual's email address may be retrieved (e.g., from the individual's mobile device or a data source 300*d*) and used to transmit an email including the determined content to the user's home computer, work computer, or mobile device, etc. In still other examples, various user account information (e.g., financial accounts, insurance accounts, social networking accounts, etc.) may be retrieved from different data sources 300*d* to allow the determined content to be presented as online advertising/content during a subsequent login by the user to the corresponding websites (e.g., financial institution websites, insurance websites, social networking websites, etc.).

In addition to the determination of the target device(s), step 405 may include the determination of target times at which the determined digital content should be presented on the target devices. For example, if determined digital content for a user is to be displayed via the user's vehicle dashboard display, then the target time for the content may be during a current driving trip, or the next driving trip taken by the user, etc. If the determined digital content is a customized television commercial for a user, then the target time for presenting the commercial may be during a time when the user is likely (or certain) to be watching television. On the other hand, if determined digital content for a user is to be transmitted to the user's personal mobile device (e.g., via SMS or MMS), automated telephone message, email, etc., then the content may be sent anytime.

Although the determination of the digital content in step 404 and the determination of the target devices (and target times) in step 405 are shown as different steps in FIG. 4, it should be understood that these steps may be combined in some implementations. For example, certain content may be better suited to certain display types, display sizes, display characteristics, and interactive features of display devices. An advertiser may desire certain targeted advertisements to be display on larger displays (e.g., televisions) and/or displays with certain characteristics or capabilities (e.g., high-definition displays, 3-D displays, etc.), while other targeted advertisements may be suitable for smaller and/or text-only displays such as some vehicle-based devices or mobile phones. Other targeted advertisements may be designed for display on interactive display devices (e.g., home computers, laptops, smartphones, etc.) that may allow the user to respond and make an immediate purchase, etc. Still other targeted advertisements or other non-advertising content (e.g., vehicle maintenance or driving safety warnings, traffic or weather alerts, etc.) may be time sensitive, and thus the selection of the target devices in step 705 may be based on the current location and/or nearest display screens to targeted users or vehicles.

In step 406, the digital content determined in step 404 may be displayed on the target devices (and target times) determined in step 405. Thus, step 406 may be similar or identical to step 205. However, as discussed above, the target devices determined in step 405 need not be roadside display systems as described in FIG. 2. Rather, in step 406, the digital content may be displayed one or more various computing devices (e.g., vehicle-based displays, smartphone or tablet computer displays, televisions, home computers, etc.), and may be displayed at different suitable times (e.g., before, during, or after driving trips).

Figure 5A:
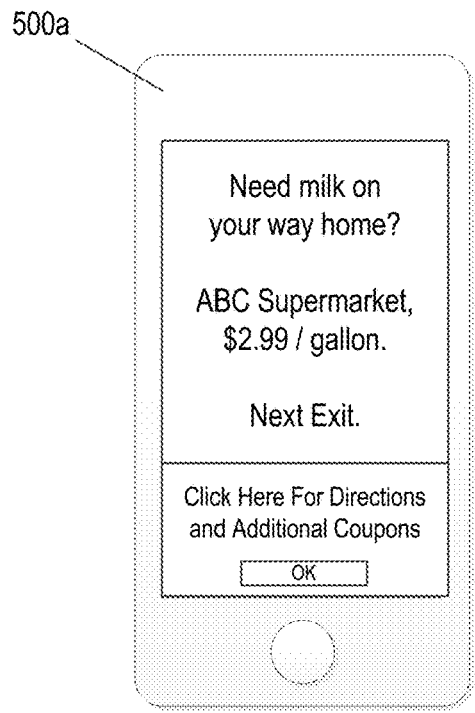
FIGS. 5A-5B are diagrams illustrating examples of electronic displays of content based on vehicle and individual characteristics and/or driving data, according to one or more aspects of the disclosure.
Figure 5B:
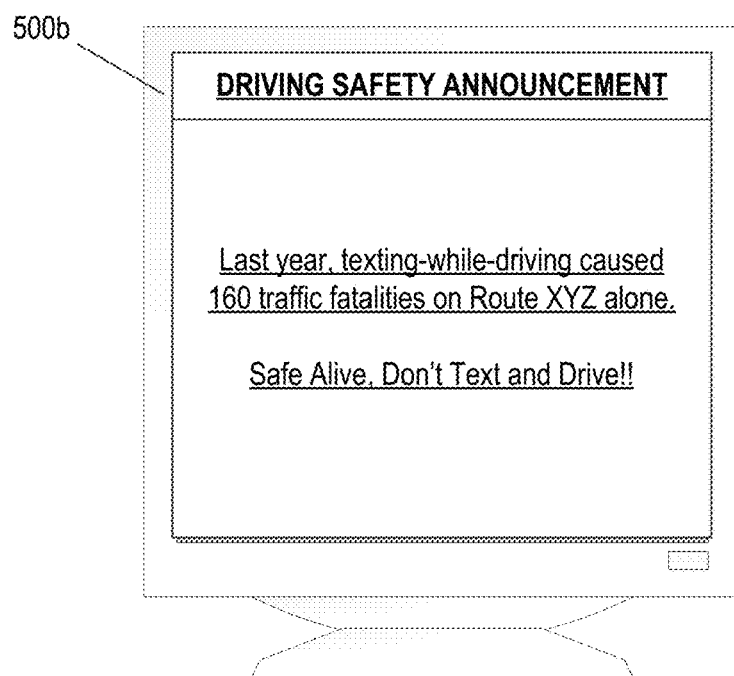

Referring now to FIGS. 5A and 5B, two example electronic displays are shown displaying content based on specific vehicle characteristics, specific individual characteristics, and/or specific driving data. The content displayed in these examples, and the display devices 500a and 500b on which the content is displayed, may be determined using the various techniques discussed above in FIG. 4.

For example, FIG. 5A shows a targeted advertisement for a supermarket displayed on a mobile device 500a. In this example, the targeted advertisement has been transmitted to the mobile device 500a and may be displayed to the user, either just before a driving trip or during a driving trip. Mobile device 500a may be, for example, the smartphone of a driver or passenger in a vehicle. The advertising content, in this case, an advertisement/coupon for milk at ABC Supermarket, was determined as described above in steps 401-404. For example, an advertising server, intermediary server, or the smartphone 500a itself, may have received and analyzed various vehicle data, individual data relating to the driver or passengers, and/or driving data, before selecting the ABC Supermarket advertisement as the content and the smartphone 500a as the target device. The data received and analyzed in this case may include, for instance, the current location of the smartphone 500a (e.g., in a moving vehicle at a current driving location), the intended destination or anticipated driving route of the vehicle carrying the smartphone, the purchasing history and preferences of the smartphone owner and/or vehicle occupants, the current time (e.g., to determine if the store is open), the average speed and other driving data for the current driving trip (e.g., to determine if the driver is in a hurry), and various other data received from roadside display systems (in step 401), vehicle/individual data sources (in step 402), and/or on-board vehicle devices (in step 403).

FIG. 5B shows a driving safety announcement on a non-mobile display device 500b, for example, a desktop computer monitor or television. Thus, unlike the example of FIG. 5A, the determined content in FIG. 5B might not be shown during a driving trip or on a mobile device. Instead, the driving safety announcement in FIG. 5B may be shown to a targeted user, via television screen 500b, monitor 500b, or other display 500b, during non-driving times such as before or after driving trips. In this case, the driving safety announcement is a warning about the dangers of texting while driving. However, the particular safety announcement displayed in FIG. 5B may be customized in multiple ways for one or more specific individuals. For instance, the data received from various sources in steps 401-403 may be analyzed to determine that a user recently drove home from work along Route XYZ, and sent three text messages during the driving trip. This data may be retrieved from the various data sources described above in steps 401-403, including roadside systems (e.g., to identify the vehicle and driver, routes driven, driving speed, passengers in the car, etc.), on-board vehicle devices such as the driver's mobile phone (e.g., to confirm the timing of the text messages sent), and various external data sources (e.g., the driver's phone records, the driver's accident history, previous driving pattern data, statistics of traffic fatalities along the driver's route, etc.). The data received in steps 401-403 may be analyzed to determine an appropriate customized driving safety message for the driver based on his driving behaviors, and to determine the appropriate target times and devices on which to display the safety message. In this case, the customized safety message may be presented shortly after the driving trip along Route XYZ, in order to increase the chances that the message will attract the driver's attention.

Figure 6:
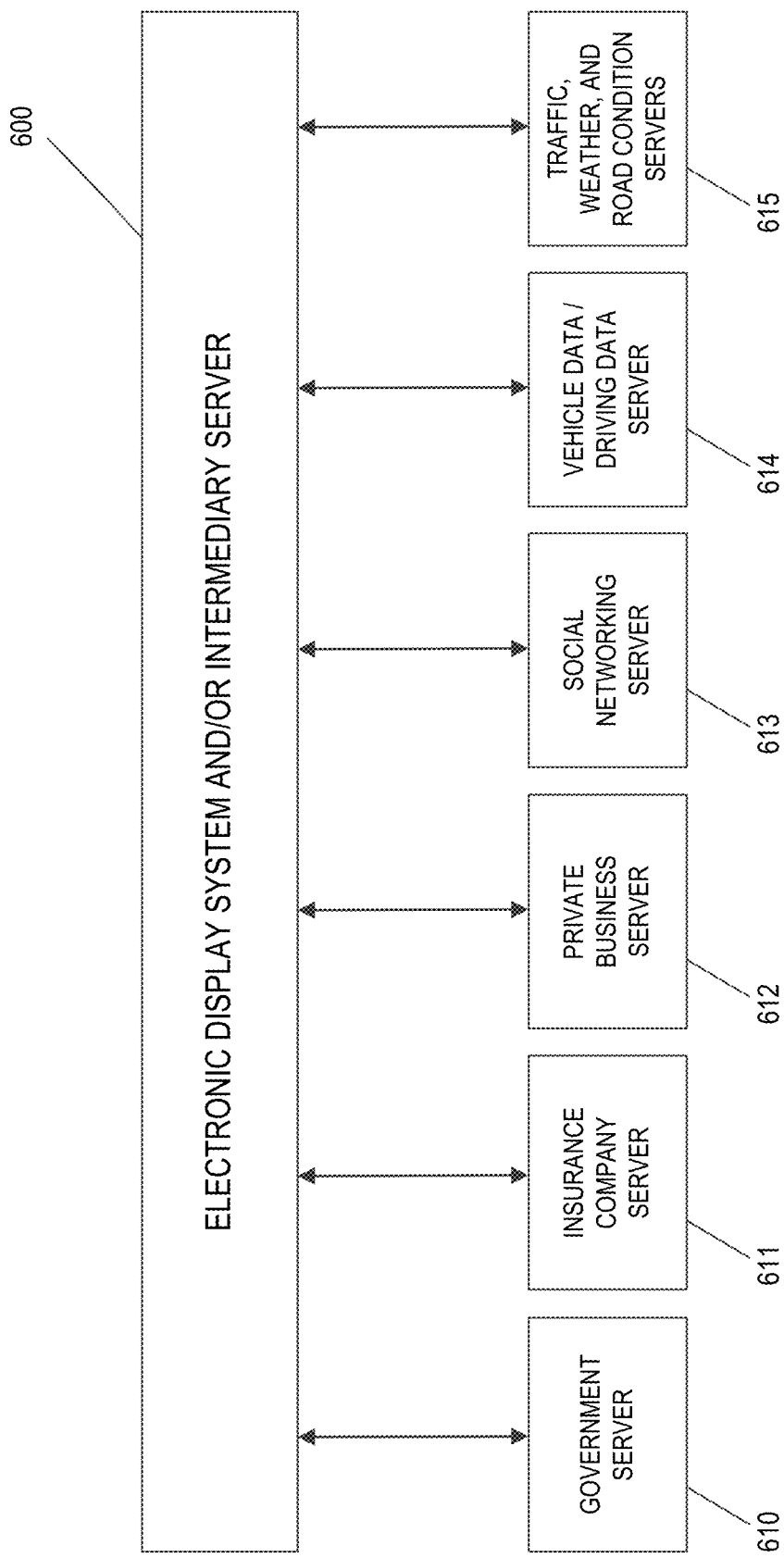
FIG. 6 is a block diagram illustrating a computing environment including an electronic display system and/or intermediary server in communication with a plurality of data source servers configured to provide data associated with a vehicle or individual, according to one or more aspects of the disclosure.

Referring now to FIG. 6 a diagram is shown illustrating a first device 600 in an electronic display system, such as an electronic display system, intermediary server, or advertising server in communication with a plurality of data source servers 610-615. As discussed above in FIGS. 2-5B, in certain embodiments, various data sources may be accessed to retrieve vehicle data, individual data, driving data, and the like, corresponding to the vehicles and individuals approaching certain roadside displays and other display devices. Data source servers may be operated by one of the same entities controlling an electronic display system, or by third-party entities (e.g., insurance companies, financial institutions, governmental entities, etc.) that permit information queries based on vehicle data or individual data. As shown in FIG. 6, one or more devices 600 (e.g., a roadside display device, intermediary server, advertising server, etc.) in an electronic display system may use vehicle-identifying information (e.g., license plate number and state, VIN, vehicle registration information, insurance policy data, etc.) and/or individual-identifying information (e.g., name, license number, social security number, mobile device number, etc.) in order to retrieve additional vehicle or individual characteristics, such as demographic data, financial data, insurance data, educational data, family data, personal data, driving data, etc. The data retrieved from such data sources may be used to determine what digital content will be displayed to approaching vehicles and individuals, as discussed above in step 204.

Several examples of potential data sources 610-615 are discussed below. However, it should be understood that different combinations of data sources may be used in different electronic display systems. Additionally, the set of data sources queried may vary from vehicle-to-vehicle and individual-to-individual during operation of an electronic display system, for example, based on the type of identifying information available to begin a query (e.g., license plate number, vehicle make and model, driver name, physical characteristics of occupants, etc.), the access credentials of the querying devices within the electronic display system, the current availability, responsiveness, and latency of the data source servers, and the like.

Governmental server 610 may include one or more servers and other computing devices from various governmental entities. For example, data source 610 may represent federal, state, and local government servers operated by agencies such as a state department of motor vehicles, a property records office, a tax records office, a census office, or a law enforcement agency. In some cases, a device 600 within an electronic display system may establish a network connection with a governmental data source 610 and transmit a request with identifying information of a vehicle or individual, to receive back governmental information regarding the vehicle or individual. Thus, the device 600 may use governmental data sources 610 to retrieve vehicle registration records, stolen vehicle records, driving records, criminal history records, income and tax records, census data, and other governmental data relating to one or more vehicles or individuals approaching an electronic display within the system. The vehicle and individual information retrieved from a governmental data source 610 may be used, for example, in step 204 to determine targeted advertisements based on demographic and financial data, driving safety reminders, and the like, via the electronic displays.

Insurance company server 611 may include servers and other computing devices associated with insurance companies and other associated institutions. Device 600 within an electronic display system may establish a network connection with an insurance server 611 to request and retrieve information relating to vehicles or individuals approaching a roadside display or other display device within the system. For example, a query to retrieve existing or previous insurance policies of the customers issued by the insurance company, coverage limits, previous accidents or other incidents relating to the vehicles or drivers, claims filed by or against the vehicle or driver, and the like. The vehicle and individual information retrieved from an insurance company data source 611 may be used, for example, in step 204 to determine an insurance advertisement or offer for a driver, other targeted advertisements, driving safety reminders, and the like, via the electronic roadside displays other display devices.

Private business server 612 may include servers and other computing devices associated with various types of private enterprises and organizations. Device 600 within an electronic display system may establish a network connection with a private business data source 612 to request and retrieve information relating to vehicles and individuals that are approaching roadside displays or other display devices, such as products and services purchased, times and dates of purchases, amounts spent, and the like. Data received from private business data sources 612 may be used to determine financial profile data, purchase habits, hobbies, travel, and lifestyle data which may be used in determining targeted advertisements for individuals via the electronic roadside displays or other display devices in the system.

Social networking server 613 may include servers and other computing devices associated with various online social network websites. Device 600 within an electronic display system may establish a network connection to a social networking data source 613 to request and retrieve information relating to an individual approaching a roadside display or other display devices (e.g., vehicle driver or passenger) or an associated individual (e.g., vehicle owner or other authorized drivers). The data retrieved may include social networking profile information, friends or contacts, associated hobbies, activities, events, clubs, or other organizations, and the like. Such data from social networking data sources 613 may be used to determine targeted advertisements and other messages for individuals via the electronic roadside displays or other display devices in the system.

Driving data and/or driving pattern servers 614 may include servers and other computing devices configured to collect and store driving data corresponding to vehicles and individuals. In some cases, data sources 614 may be on-board vehicle computing devices (e.g., 310*a*-310*c*, 311*a*-311*b*, etc.), such as vehicle-based computers, telematics and navigation devices, smartphones of drivers or passengers, etc. Such devices may be configured to collect and store driving trips logs, driving statistics, accident records, etc., and may be queried by device 600 to retrieve such data. Data sources 614 also may include servers or devices separate from the vehicles or individuals, such as traffic servers, insurance servers, or governmental servers which may collect and store driving data or driving patterns for specified vehicles or individuals. The data retrieved from driving data and driving pattern data sources 614 may be used to determine targeted advertisements (e.g., based on anticipated driving route and intended destinations), or provide driving safety alerts and other messages for individuals via the electronic roadside displays or other display devices in the system.

Driving conditions data sources 615, which may include traffic servers, weather servers, road condition servers, and other computing devices, may be configured to store and provide driving condition data associated with specific locations and driving routes. For example, various driving conditions data sources 615 may include servers storing traffic data, weather data, road condition data, data relating to other road hazards and/or other driving conditions. Such driving condition data may be stored based on location (e.g., address or GPS coordinates), or street name and/or cross street, or based on point-to-point driving routes. Additional driving conditions data sources 615 may include data sources storing records of accidents and/or insurance claims filed, and other data sources 615 may store records regarding driving routes, such as driving times for specific stretches of roads and/or specific driving routes, including driving time data for different months, days, and times of the day, and data for different weather conditions, road conditions, and traffic conditions, etc. A device 600 in an electronic display system may establish a network connection with a driving condition data source 615 to request and retrieve information relating to the current or upcoming driving routes, characteristics of the intended destinations and driving routes associated with the vehicle or individual (e.g., frequently driven roads and routes, and corresponding days and times the customer drives, etc.). Such data may be retrieved from driving conditions data sources 615 in order to determine traffic alerts, weather alerts, road construction alerts, suggested alternative routes to a vehicle's intended destination, and the like, via the electronic roadside displays or other display devices in the system.

Figure 7:
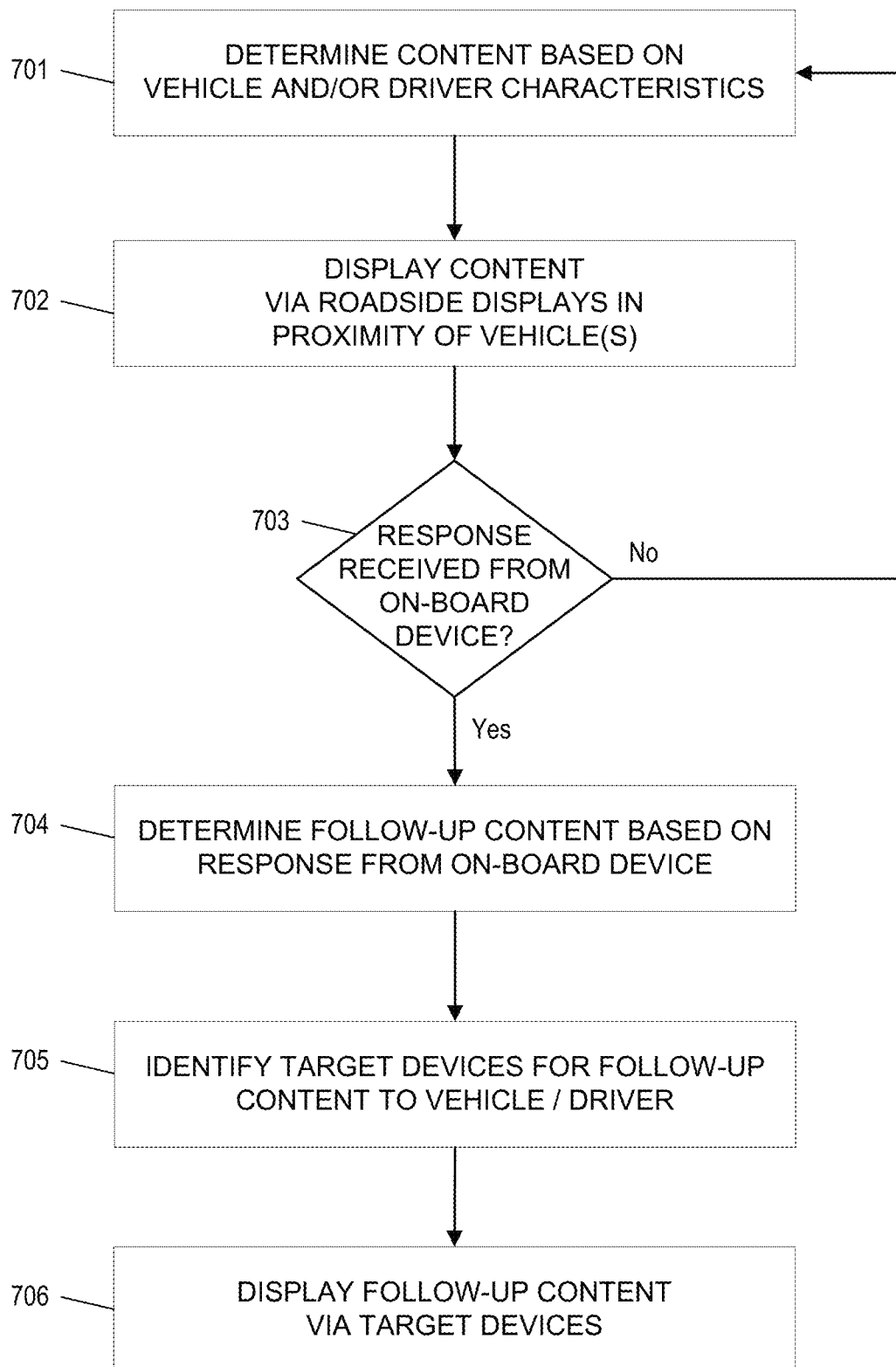
FIG. 7 is a flow diagram illustrating an example method of displaying follow-up content to a vehicle or individual, based on a received response to initial digital content displayed via a display device, according to one or more aspects of the disclosure.

FIG. 7 is a flow diagram illustrating an example method of receiving a response to content displayed via an electronic display device, and determining and displaying follow-up content based on the response. The various embodiments and examples described in connection with FIG. 7 may be implemented using a number of computing systems (e.g., any of FIGS. 3A-3D of FIGS. 5A-5B), operating individually or in combination, such as electronic roadside displays, on-board vehicle systems, intermediary servers and other computing devices. Each of computing devices and systems in these examples may include some or all of hardware, software, and networking components as the illustrative computing device 101 described in FIG. 1.

In step 701, digital content is determined for an electronic roadside display (e.g., 300*a*, 300*b*, etc.) based on the characteristics of one or more vehicles or individuals approaching the electronic roadside display. Thus, step 701 may be similar or identical to steps 204 and/or 404, discussed above. In various examples, the content determined step 701 may correspond to targeted advertisements, vehicle maintenance suggestions, driving safety warnings, and notifications about upcoming driving conditions. Additionally, as discussed above, the determination in step 701 may be performed by any of several different system components, such as an electronic roadside display, a vehicle-based computing system, a user's smartphone or other mobile device, an intermediary server, or any combination of these devices.

In step 702, the digital content determined in step 701 may be displayed on one or more appropriate electronic roadside displays within the system, at the appropriate times to be viewable by the vehicles and individuals whose characteristics were received and analyzed in step 701. Thus, step 702 may be similar or identical to step 205 and/or 406, discussed above. Additionally, although the initial digital content in this example is displayed via an electronic roadside display, it should be understood that the in other examples the initial content may be display via non-roadside digital displays, such as televisions, home computing devices, vehicle-based devices, personal mobile devices, and the like.

In step 703, a response may be received via an on-board computing device (e.g., 310*b*-312*b*, etc.), to the content displayed via an electronic roadside display in step 702. In some cases, in order to receive a response in step 703, a user interface may be rendered on one or more on-board vehicle devices concurrently with the digital content being displayed on the electronic roadside display in step 702. In such cases, a vehicle driver or passenger, in response to viewing the content on the electronic roadside display, may respond via the user interface rendered on the on-board vehicle computing device. The on-board vehicle computing device may correspond to a vehicle-based computer (e.g., vehicle computer or diagnostic system, telematics device, navigation system, etc.), or to a user's mobile device (e.g., a smartphone or portable computer of a driver or passenger). The on-board vehicle device may receive a signal, and/or user interface content, from an electronic roadside display (e.g., 300*a*, 300*b*, etc.) or an intermediary server (e.g., 320*c*, 320*d*, etc.) at or near the same time that the determined content is displayed on the roadside display.

When electronic roadside display systems support user responses and interactivity between roadside displays and on-board vehicle devices, such systems may be used to present questions or product offers to vehicle occupants using the roadside displays, and then receive answers from users via their on-board vehicle devices. For example, a roadside displays may display present a targeted advertisement for Product ABC along with a question for users (e.g., "Would you like to receive more information about Product ABC?"), or to inquire about the vehicle's destination and offer information or assistance (e.g., "Are you going to the XYZ Shopping Mall? If so, would you like a parking recommendation based on the current parking garage availability?). In these examples, the user interface displayed on the on-board vehicle system may be a generic user interface that is not specific to the content displayed on the roadside display (e.g., a simple "Yes" or "No" screen to allow the user to respond to the question). In other examples, an electronic roadside display, intermediary server, or other device in the system may transmit a customized response user interface to one or more on-board vehicle devices when the targeted advertisement or other message is displayed on the roadside display. Customized response user interfaces may allow users to provide specific responses to questions or other content on an electronic roadside display (e.g., "How much are you currently paying for car insurance? Enter your current rate now to receive a quote." or "Are you looking for nearby store or restaurant? Speak the name now to get directions."). As these examples illustrate, responses may be received by the on-board vehicle device via spoken voice input from the driver or a passenger, via typed or touch screen input into a vehicle-based system or an occupant's mobile device, or other input technique. In still other examples, a driver's response might not be received via an on-board vehicle device, but rather may be received based on the route the driver takes after passing the roadside display (e.g., "Take Exit 8 to receive additional information about local hotels with vacancies tonight."). In this example, the system displaying the digital content may presume an affirmative response by the driver if the vehicle follows a route suggested by the initial digital content.

In step 704, if a user response is received via an on-board vehicle device (703:Yes), then follow-up digital content may be determined for the user that responded, based on the user's response and/or the characteristics of the user's vehicle or the occupants in the user's vehicle. In some cases, a specific user response is required in order for follow-up content to be determined in step 704. For example, if the initial digital content displayed on a roadside display asks the user if they would like to receive additional information relating to a product or server, then only users answering "Yes" will receive follow-up information. In this example, the follow-up information determined in step 704 may include additional details and/or contact information relating to the product or service displayed in step 702. As another example, if the initial digital content displayed on a roadside display asks the user if they need directions or a suggested route to a destination, then the follow-up information determined in step 704 may include the directions and suggested driving route based on the current day and time, current weather and traffic conditions, other warnings or alerts, etc. Additionally, if the initial digital content displayed on a roadside display asks the user for information about a current product or service of the user (e.g., the user's mobile provider and current contact term, the user's insurance company and current rates, etc.), then the follow-up information determined in step 704 may include an offer or other incentive for the user to switch products or services, in which the offer or incentive is based on the information that the user input in step 703.

Additionally, the follow-up content determined in step 704 may be further based on the vehicle and individual characteristics associated with an on-board vehicle device from which the response was received. For example, if a group of ten vehicles is identified as approaching the same electronic roadside display, then the initial content determined for the display in step 701 may be based on characteristics of some or all of the ten vehicles and/or their occupants (e.g., using aggregation techniques or prioritizing different characteristics, as discussed above in step 204). However, if only one or a few of the ten vehicles responds to the initial content in step 703, then the follow-up content determined in step 704 may be based on the characteristics associated with the responding vehicles and/or individuals, while excluding the vehicles and/or individuals that did not respond to the initial content.

In step 705, one or more target devices are determined on which to display the follow-up digital content determined in step 704. In some cases, a second roadside display may be selected in step 705 to display the follow-up content. For example, if two electronic roadside displays are positioned a mile apart on the same road or highway, then the initial digital content may be displayed on the first roadside display, and after responses are received from one or more on-board vehicle devices, the determined follow-up content may be displayed on the second roadside display. In other examples, the driving routes and intended destinations may be determined for any vehicles responding to the initial digital content in step 703, and a second roadside display may be selected along a vehicle's anticipated driving route. Therefore, when two vehicles respond to the same digital content on the same roadside display, the follow-up content may be sent to the two vehicles using different roadside displays based on the different anticipated driving routes and destinations of the two vehicles.

Additionally, in some cases, the follow-up content determined in step 704 may be transmitted to another computing device associated with a responding user, rather than to an electronic roadside display. For example, the follow-up content determined in step 704 (e.g., additional product information, directions to an intended destination, etc.) may be transmitted back to the on-board vehicle device that received the user's response in step 703. Thus, when a user responds via a vehicle-based computing system, the follow-up content may be transmitted by an electronic roadside display, intermediary server, or other communications network device, to the same vehicle-based computing system. Similarly, users responding to the initial content using their mobile devices may receive the follow-up content via their mobile devices.

In still other cases, the follow-up content determined in step 704 may be transmitted to another computing device or account associated with the responding user. For example, a user responding to an electronic roadside advertisement via a vehicle-based system (e.g., vehicle console computer, navigation or telematics device, etc.) may receive the determined follow-up data transmitted to their personal mobile device (e.g., smartphone or other personal portable device). In this example, the follow-up data may be transmitted by text message, a short-message-service (SMS) message, or via a mobile software application on the user's mobile device. The follow-up content also may be sent via email, for example, after retrieving an email address for the user(s) responding to the content in step 703 from one or more external data sources. In such cases, an initial determination may be performed to identify which individual(s) within the vehicle provided the response to the electronic roadside display in step 703. Such determinations may be performed by requiring to user to self-identify during the response, by using voice recognition techniques identify spoken responses, among other techniques. Alternatively, when the specific individual(s) responding via a vehicle-based device cannot be determined, the follow-up content may be sent by default to the vehicle driver, vehicle owner, or to each of vehicle's occupants.

In step 706, after determining the follow-up digital content to transmit to user(s) responding to the initial roadside display content, and identifying the target device(s) on which the follow-up content should be provided to the user(s), the follow-up content may be transmitted to and/or displayed on the identified target devices.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. An electronic display system comprising:
   one or more processors;
   a network interface configured to transmit content to one or more digital roadside displays; and
   at least one memory storing computer-readable instructions that, when executed by the one or more processors, cause the electronic display system to:
   receive driving pattern data for a first vehicle including driving behaviors and driving performance metrics;
   identify, from the driving pattern data, an expected destination of a current driving trip;
   based on the identified expected destination of the current driving trip, identify an anticipated driving route to the expected destination;
   identify, based on the anticipated driving route, an expected time at which a first vehicle will be in proximity of one or more digital roadside displays;
   determine first digital content for the one or more digital roadside displays based on the driving pattern data for the first vehicle;
   determine a display time for displaying the first digital content based on the expected time at which the first vehicle will be in proximity of the one or more digital roadside displays; and
   transmit the first digital content and the display time via the network interface to the one or more digital roadside displays.

2. The electronic display system of claim 1, wherein determining the first digital content comprises selecting an advertisement or message for the one or more digital roadside displays, based on the identified expected destination of the first vehicle and the driving pattern data for the first vehicle.

3. The electronic display system of claim 1, further including instructions that, when executed, cause the electronic display system to:
   receive diagnostic or maintenance data of the first vehicle, and
   wherein the first digital content for the one or more digital roadside displays is determined based on the diagnostic or maintenance data of the first vehicle and the driving pattern data for the first vehicle.

4. The electronic display system of claim 1,
   wherein receiving the driving pattern data further includes receiving an indication that the first vehicle has engaged in high-risk driving during a driving trip, and
   wherein the first digital content for the one or more digital roadside displays or other digital displays is determined based on the indication that the first vehicle has engaged in high-risk driving during the driving trip.

5. The electronic display system of claim 1, further including instructions that, when executed, cause the electronic display system to:
   receive a digital short-range communication transmission from the first vehicle indicating at least one of a location, speed, route, or direction of travel of the first vehicle.

6. The electronic display system of claim 1, wherein receiving the driving pattern data of the first vehicle comprises:
   receiving the driving pattern data from the first vehicle via a digital short-range communication transmission.

7. The electronic display system of claim 1, further including instructions that, when executed, cause the electronic display system to:
   determine a current location of the first vehicle;
   compare the current location of the first vehicle to locations of the one or more digital roadside displays; and
   identify a first digital roadside display within a proximity of the current location of the first vehicle based on the comparison.

8. The electronic display system of claim 7, wherein the current location of the first vehicle is determined based on global positioning system data.

9. The electronic display system of claim 7, further including instructions that, when executed, cause the electronic display system to:
- identify at least a second digital roadside display based on the anticipated driving route of the first vehicle; and
- display second digital content on the at least a second digital roadside display.

10. A method, comprising:
- receiving, by an electronic display system, driving pattern data of a first vehicle including driving behaviors and driving performance metrics;
- identifying, by the electronic display system and from the driving pattern data, an expected destination of a current driving trip;
- based on the identified expected destination of the current driving trip, identifying, by the electronic display system, an anticipated driving route to the expected destination;
- identifying, by the electronic display system and based on the anticipated driving route, an expected time at which a first vehicle will be in proximity of one or more digital roadside displays;
- determining, by the electronic display system, first digital content for one or more digital roadside displays, based on the driving pattern data of the first vehicle;
- determining, by the electronic display system, a display time for displaying the first digital content based on the expected time at which the first vehicle will be in proximity of the one or more digital roadside displays; and
- transmitting, by the electronic display system, the first digital content and the display time via a network interface to a first digital roadside display of the one or more digital roadside displays.

11. The method of claim 10, further including:
- receiving diagnostic or maintenance data of the first vehicle, and
- wherein the first digital content for the one or more digital roadside displays is determined based on the diagnostic or maintenance data of the first vehicle and the driving pattern data of the first vehicle.

12. The method of claim 10,
- wherein receiving the driving pattern data comprises receiving an indication that the first vehicle has engaged in high-risk driving during a driving trip, and
- wherein the first digital content for the one or more digital roadside displays is determined based on the indication that the first vehicle has engaged in high-risk driving during the driving trip.

13. The method of claim 10, further including:
- determining a current location of the first vehicle;
- comparing, by the electronic display system, the current location of the first vehicle to locations of the one or more digital roadside displays; and
- identifying, by the electronic display system, the first digital roadside display within a proximity of the current location of the first vehicle based on the comparison.

14. The method of claim 13, wherein the current location of the first vehicle is determined based on global positioning system data.

15. The method of claim 13, further including:
- identifying, by the electronic display system, at least a second digital roadside display based on the anticipated driving route of the first vehicle; and
- displaying second digital content on the at least a second digital roadside display.

16. One or more non-transitory computer-readable media storing computer-executable instructions that, when executed, cause at least one computing device to:
- receive driving pattern data of a first vehicle including driving behaviors and driving performance metrics;
- identify, from the driving pattern data, an expected destination of a current driving trip;
- based on the identified expected destination of the current driving trip, identify an anticipated driving route to the expected destination;
- identify, based on the anticipated driving route, an expected time at which a first vehicle will be in proximity of one or more digital roadside displays;
- determine first digital content for the one or more digital roadside displays, based on the driving pattern data of the first vehicle;
- determine a display time for displaying the first digital content based on the expected time at which the first vehicle will be in proximity of the one or more digital roadside displays; and
- transmit the first digital content and the display time via a network interface to the one or more digital roadside displays.

17. The one or more non-transitory computer-readable media of claim 16,
- wherein receiving the driving pattern data of the first vehicle comprises receiving an indication that the first vehicle has engaged in high-risk driving during a driving trip, and
- wherein the first digital content for the one or more digital roadside displays is determined based on the indication that the first vehicle has engaged in high-risk driving during the driving trip.

18. The one or more non-transitory computer-readable media of claim 16, wherein determining the first digital content comprises selecting an advertisement or message for the one or more digital roadside displays, based on the identified expected destination of the first vehicle and the driving pattern data for the first vehicle.

19. The one or more non-transitory computer-readable media of claim 16, further including instructions that, when executed, cause the at least one computing device to:
- receive diagnostic or maintenance data of the first vehicle, and
- wherein the first digital content for the one or more digital roadside displays is determined based on the diagnostic or maintenance data of the first vehicle and the driving pattern data for the first vehicle.

20. The one or more non-transitory computer-readable media of claim 16, further including instructions that, when executed, cause the at least one computing device to:
- receive a digital short-range communication transmission from the first vehicle indicating at least one of a location, speed, route, or direction of travel of the first vehicle.

* * * * *